(12) United States Patent
Lee et al.

(10) Patent No.: US 12,079,044 B2
(45) Date of Patent: Sep. 3, 2024

(54) ELECTRONIC DEVICE HAVING FLEXIBLE DISPLAY AND METHOD FOR PROVIDING CONTROL PANEL ACCORDING TO MODE CHANGE THEREOF

(71) Applicant: SAMSUNG ELECTRONICS CO., LTD., Suwon-si (KR)

(72) Inventors: Hyeonseung Lee, Suwon-si (KR); Iseul Song, Suwon-si (KR); Zion Kwon, Suwon-si (KR); Seoyoung Son, Suwon-si (KR); Jaein Yoo, Suwon-si (KR); Seungchan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 17/672,064

(22) Filed: Feb. 15, 2022

(65) Prior Publication Data
US 2022/0221910 A1    Jul. 14, 2022

Related U.S. Application Data

(63) Continuation of application No. PCT/KR2022/000471, filed on Jan. 11, 2022.

(30) Foreign Application Priority Data

Jan. 11, 2021 (KR) ........................ 10-2021-0003222

(51) Int. Cl.
*G06F 1/16* (2006.01)
*G06F 3/03* (2006.01)
*G06F 3/048* (2013.01)

(52) U.S. Cl.
CPC .......... *G06F 1/1677* (2013.01); *G06F 1/1652* (2013.01); *G06F 3/03* (2013.01); *G06F 3/048* (2013.01)

(58) Field of Classification Search
CPC ........ G06F 1/1677; G06F 1/1652; G06F 3/03; G06F 3/048
(Continued)

(56) References Cited

U.S. PATENT DOCUMENTS

| | | |
|---|---|---|
| 9,606,574 B2 | 3/2017 | Park et al. |
| 10,423,193 B2 | 9/2019 | Kim et al. |

(Continued)

FOREIGN PATENT DOCUMENTS

| | | |
|---|---|---|
| CN | 103870282 | 6/2015 |
| CN | 109951733 | 6/2019 |

(Continued)

OTHER PUBLICATIONS

Prak Doosik et al. Electronic Device Having Two Display Surfaces and Method for Operating a Display Thereof Oct. 5, 2020 Samsung Electronics Co Ltd KR20200112378 (A) paras. 12-193 English.*

(Continued)

*Primary Examiner* — Prabodh M Dharia
(74) *Attorney, Agent, or Firm* — Nixon & Vanderhye P.C.

(57) ABSTRACT

Various embodiments of the disclosure provide an electronic device (e.g., foldable device) having a flexible display and a method for providing a control panel according to a mode change thereof. The electronic device according to various embodiments may include: a display module including a display, and a processor operatively connected to the display module, wherein the processor may be configured to: sense execution of a designated mode in which the electronic device switches from a first state to a second state while a designated user interface is displayed as a full screen, perform, based on the sensing of entering the designated mode, screen splitting wherein the full screen is split into a first display surface and a second display surface, display designated user interfaces on the first display surface and the (Continued)

second display surface, respectively, and separately provide, based on the user interfaces of the first display surface and/or the second display surface, control panels related to the corresponding display surfaces.

20 Claims, 17 Drawing Sheets

(58) Field of Classification Search
USPC .................................................. 345/501, 174
See application file for complete search history.

(56) References Cited

U.S. PATENT DOCUMENTS

| | | | |
|---|---|---|---|
| 11,093,203 | B2 | 8/2021 | Park et al. |
| 2014/0035869 | A1* | 2/2014 | Yun ..................... G06F 1/1652 345/174 |
| 2016/0210111 | A1 | 7/2016 | Kraft |
| 2017/0345397 | A1 | 11/2017 | Tsukamoto et al. |
| 2018/0331991 | A1* | 11/2018 | Kim ..................... G06F 3/0486 |
| 2020/0125144 | A1 | 4/2020 | Chung et al. |
| 2020/0177726 | A1* | 6/2020 | Zhang ................. G06F 3/04886 |
| 2021/0019022 | A1 | 1/2021 | Yi |
| 2022/0197584 | A1* | 6/2022 | Zheng .................. G06F 1/1641 |

FOREIGN PATENT DOCUMENTS

| | | |
|---|---|---|
| KR | 10-2015-0093090 | 8/2015 |
| KR | 10-2018-0061059 | 6/2018 |
| KR | 10-2020-0112378 | 10/2020 |
| KR | 10-2197396 | 1/2021 |

OTHER PUBLICATIONS

Prak Doosik et al. Electronic Device Having Two Display Surfaces and Method for Operating a Display Thereof Oct. 5, 2020 Samsung Electronics Co Ltd KR20200112378 (A) drawings 1-17.*
Wei Yuxing et al. Method and device for adjusting icon display mode Shenzhen ZTE Mobile Tech Co CN103870282 (A) Jun. 18, 2014 paras. 7-92 English.*
Wei Yuxing et al. Method and device for adjusting icon display mode Shenzhen ZTE Mobile Tech Co CN103870282 (A) Jun. 18, 2014 drawings 1-4 chinese.*
Search Report and Written Opinion issued Apr. 15, 2022 in counterpart International Patent Application No. PCT/KR2022/000471.

* cited by examiner

[801]

[803]

ELECTRONIC DEVICE HAVING FLEXIBLE DISPLAY AND METHOD FOR PROVIDING CONTROL PANEL ACCORDING TO MODE CHANGE THEREOF

CROSS-REFERENCE TO RELATED APPLICATIONS

This application is a continuation of International Application No. PCT/KR2022/000471 designating the United States, filed on Jan. 11, 2022, in the Korean Intellectual Property Receiving Office and claiming priority to Korean Patent Application No. 10-2021-0003222, filed on Jan. 11, 2021, in the Korean Intellectual Property Office, the disclosures of which are incorporated by reference herein in their entireties.

BACKGROUND

Field

The disclosure relates to an electronic device (for example, foldable device) having a flexible display, and a method for providing a control panel according to a mode change thereof.

Description of Related Art

In line with development of digital technologies, there has been widespread use of various types of electronic devices such as a mobile communication terminal, a personal digital assistant (PDA), an electronic wallet, a smart phone, tablet personal computer (PC), and/or a laptop PC. In order to support and enhance functions of such electronic devices, hardware parts and/or software parts of electronic devices have been continuously improved.

An electronic device may have a limited size for portability, and this restricts the display size. Accordingly, various types of electronic devices have been developed such that electronic devices provide more expanded screens by means of multi-display. For example, an electronic device includes multiple displays so as to provide an expanded screen through multi-display. As another example, electronic devices have been designed such that the screen size gradually increases from displays having limited sizes, thereby providing users with various services (or functions) through large screens.

Recent electronic devices may have a new form factor, such as a multi-display (for example, dual display) device (for example, foldable device). A foldable device may be equipped with a folded (or bended) display (for example, flexible display or foldable display), and may be folded or unfolded and used. In line with a new form factor (for example, multi-display implementation) of electronic devices, there has been an increasing need for development regarding a user interface (UI) corresponding multi-display and operations thereof.

SUMMARY

Embodiments of the disclosure provide a method and an apparatus wherein, in connection with an electronic device (for example, foldable device) having a flexible display which can be distinguished into at least two display surfaces (or display regions), a control panel can be provided through at least one display surface (or display region) according to a mode change of the electronic device.

Embodiments of the disclosure provide a method and an apparatus wherein, based on physical characteristics regarding folding of an electronic device, through at least one distinguished display surface, a corresponding control panel can be provided independently.

Embodiments of the disclosure provide a method and an apparatus wherein, in a mode in which an electronic device is partially folded such that the screen is divided in at least two directions (for example, tent mode, flex mode, or screen division mode), a control panel can be provided such that attributes related to respective divided display surfaces can be changed.

An electronic device according to an example embodiment of the disclosure may include: a display module including a display, and a processor operatively connected to the display module, wherein the processor is configured to: sense execution of a designated mode in which the electronic device switches from a first state to a second state while a designated user interface is displayed as a full screen, perform, based on the sensing of entering the designated mode, screen splitting wherein the full screen is split into a first display surface and a second display surface, control the display module to display designated user interfaces on the first display surface and the second display surface, respectively, and separately provide, based on the user interfaces of the first display surface and/or the second display surface, control panels related to the corresponding display surfaces.

A method of operating an electronic device according to an example embodiment of the disclosure may include: sensing execution of a designated mode in which the electronic device switches from a first state to a second state while a designated user interface is displayed as a full screen, performing, based on the sensing of entering the designated mode, screen splitting wherein the full screen is split into a first display surface and a second display surface, displaying designated user interfaces on the first display surface and the second display surface, respectively, and separately providing, based on the user interfaces of the first display surface and/or the second display surface, control panels related to the corresponding display surfaces.

In order to address the above-mentioned problems, various example embodiments of the disclosure may include a computer-readable recording medium in which a program for executing the method in a processor is recorded.

Additional ranges of applicability of the disclosure will become apparent from the following detailed description. However, various changes and modifications can be clearly understood by those skilled in the art within the idea and scope of the disclosure, and detailed descriptions and specific embodiments such as example embodiments of the disclosure are therefore to be understood as being given as examples only.

An electronic device and a method for operating the same according to various example embodiments of the disclosure, in connection with an electronic device (for example, foldable device) having a flexible display which can be distinguished into at least two display surfaces (or display regions), a control panel appropriate for the user's display use environment can be provided through at least one display surface (or display region) according to a mode change of the electronic device.

An electronic device according to various example embodiments of the disclosure, when entering (or state change) a mode in which the electronic device is partially folded such that the screen is divided in at least two directions (for example, tent mode or flex mode), corresponding control panels (for example, volume control panel, sound path control panel, display brightness control panel, and/or mirroring control channel) may be provided such that attributes (for example, sound path, display brightness, audio volume, or screen mirroring) related to respective display surfaces can be changed (or adjusted or controlled). According to various example embodiments of the disclosure, when a user(s) uses an electronic device in a mode in which the electronic device is partially folded such that the screen is divided in at least two directions, the user can change more conveniently attributes related to respective display surfaces through control panels provided for respective display surfaces.

Various other advantageous effects identified explicitly or implicitly through the disclosure may be provided.

BRIEF DESCRIPTION OF THE DRAWINGS

In describing the drawings, identical or similar reference numerals may be used to designate identical or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
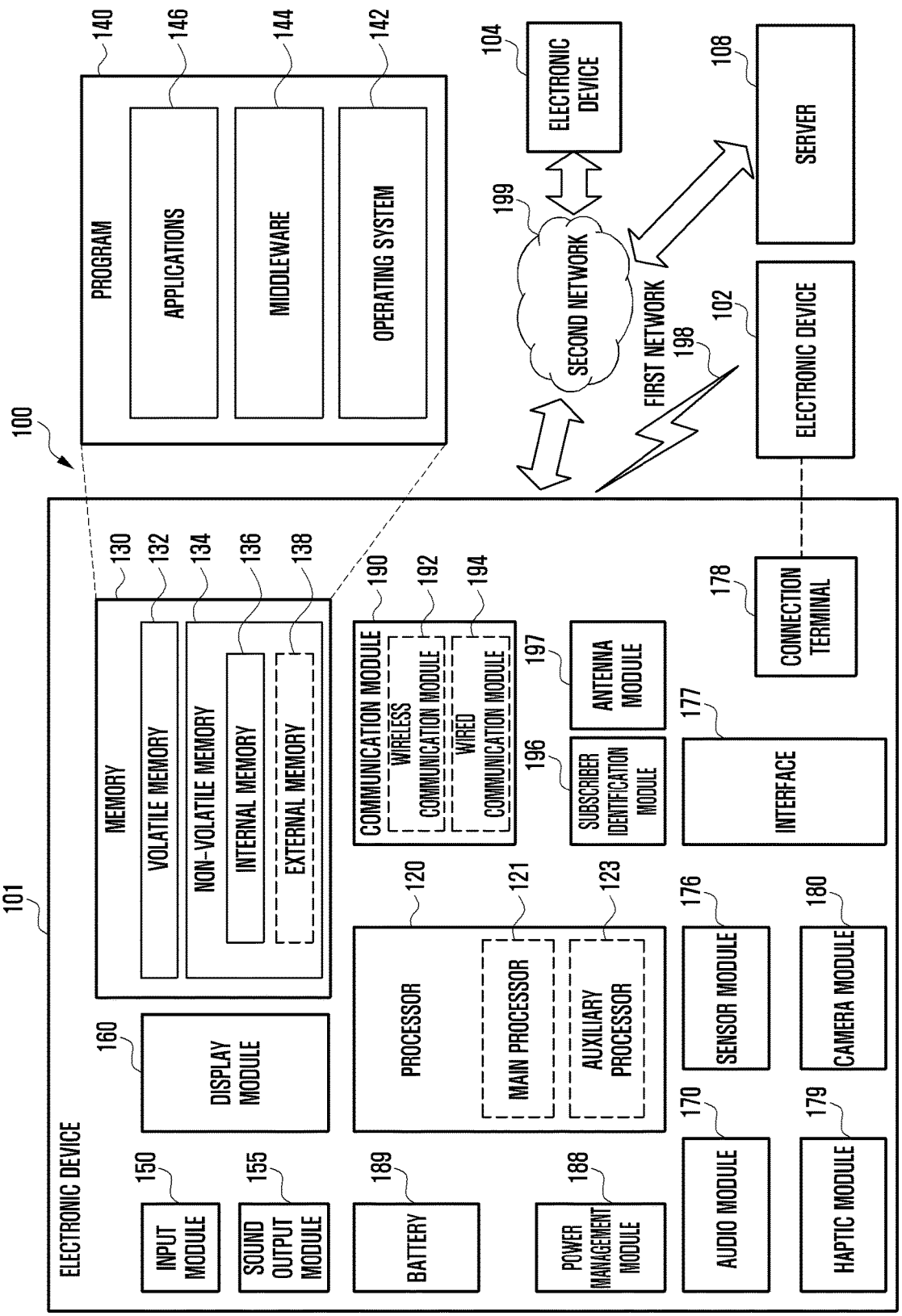
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
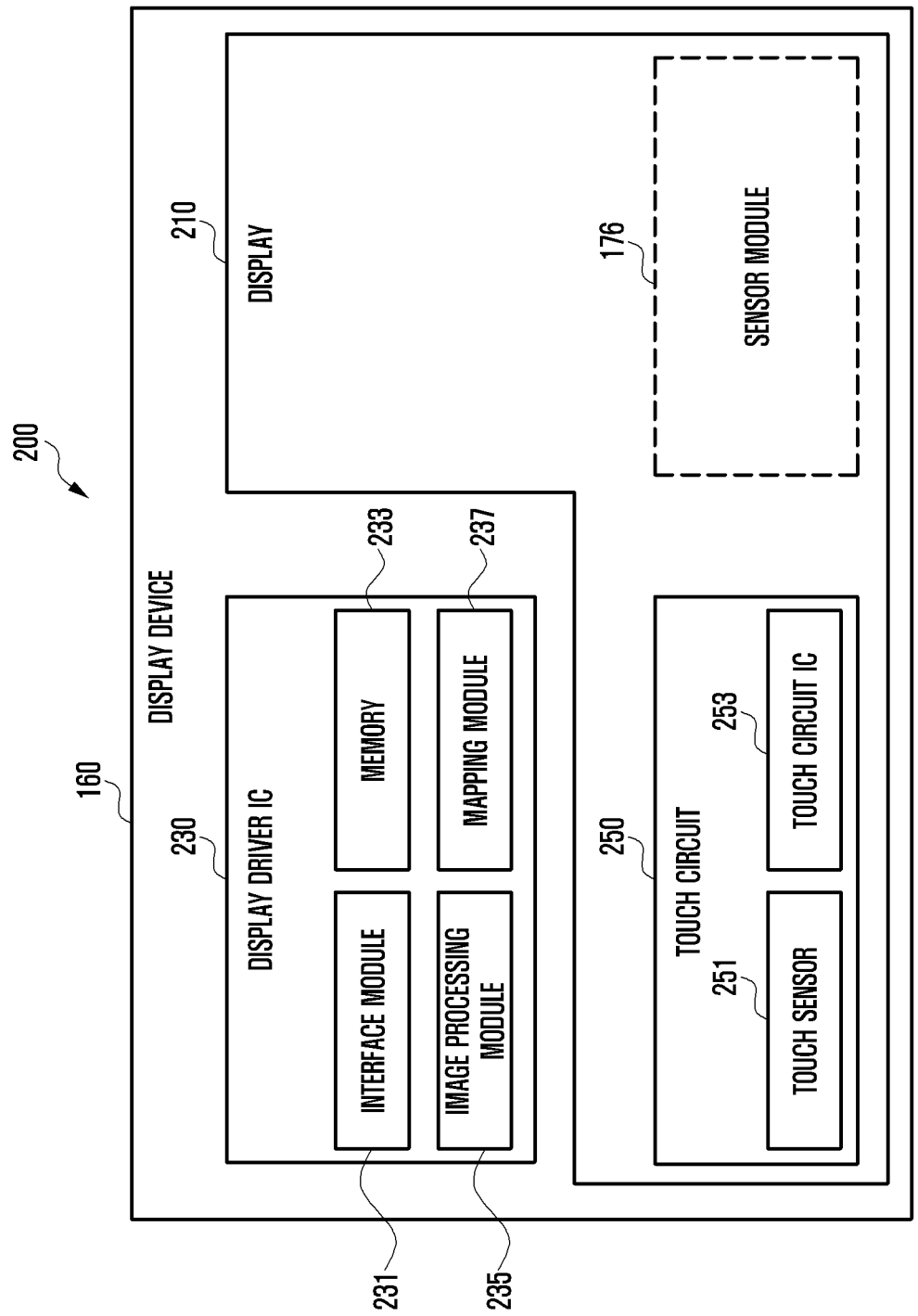
FIG. 2 is a block diagram illustrating an example configuration of a display module according to various embodiments.

FIG. 2 is a block diagram 200 illustrating an example configuration of the display module 160 according to various embodiments.

Referring to FIG. 2, the display module 160 may include a display 210 and a display driver integrated circuit (DDI) 230 to control the display 210. The DDI 230 may include an interface module (e.g., including interface circuitry) 231, memory 233 (e.g., buffer memory), an image processing module (e.g., including image processing circuitry) 235, and/or a mapping module (e.g., including mapping circuitry and/or executable program instructions) 237.

The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may include various processing circuitry and perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may include various circuitry and/or executable program instructions and generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may include a display and further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
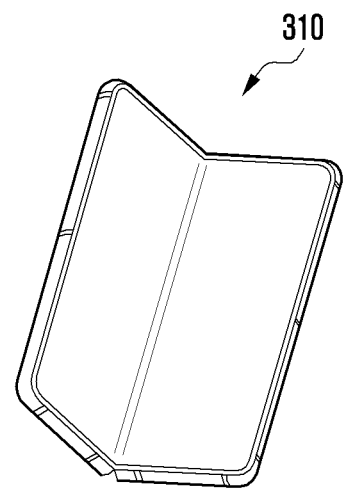
FIG. 3 is a diagram illustrating an example of an electronic device according to various embodiments.
Figure 3:
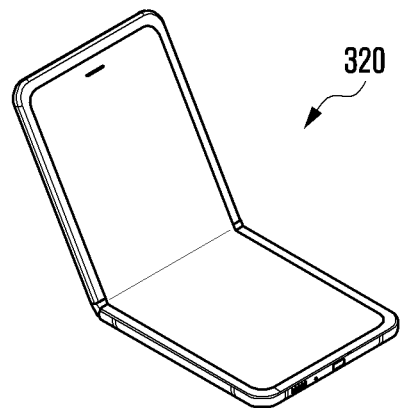
Figure 3:
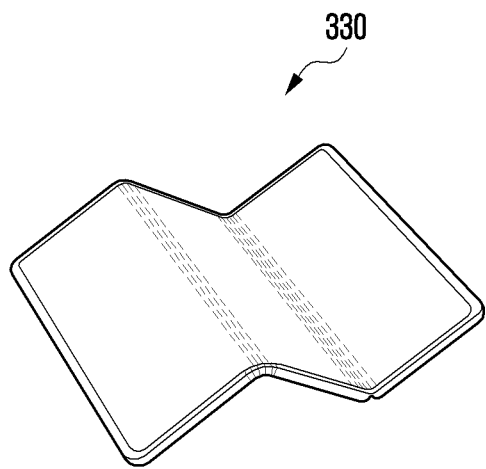

FIG. 3 is a diagram illustrating an example of an electronic device according to various embodiments.

According to an embodiment, FIG. 3 may show an example of various form factors of an electronic device 101 according to various display types. According to an embodiment, as illustrated in FIG. 3, the electronic device 101 may be implemented in various types, and a display (e.g., the display module 160 in FIG. 1) may be provided in various types according to the implemented types of the electronic device 101.

In relation to the electronic device 101 according to various embodiments disclosed herein, the electronic device 101 (e.g., the foldable device 310, 320, or 330) having a foldable form factor is described as an example, but the electronic device 101 and an operation thereof are not limited thereto. For example, the electronic device 101 may have various form factors, such as bar-type or plate-type (not shown), rollable (not shown), and/or slidable (not shown), which do not include a folding axis but can be split into at least two screens, and may operate thereby.

According to an embodiment, the electronic device 101 (e.g., the foldable device 310, 320, or 330) may refer to an electronic device in which two different regions of a display (e.g., the display module 160 in FIG. 1) can be folded to substantially face each other or to face directions opposite to each other. Typically, while being carried, the display (e.g., the display module 160 in FIG. 1 or 2) of the electronic device 101 (e.g., the foldable device 310, 320, or 330) may be folded in a direction in which two different regions face each other or are opposite to each other, and, in an actual use state, a user may unfold the display such that the two different regions form a substantially flat plate shape.

According to an embodiment, the electronic device 101 (e.g., the foldable device 310, 320, or 330) may include a form factor (e.g., 310 or 320) including two display surfaces (e.g., a first display surface and a second display surface) based on one folding axis and/or a form factor (e.g., 330) including at least three display surfaces (e.g., a first display surface, a second display surface, and a third display surface) based on at least two folding axes. Various embodiments are not limited thereto, and these are provided for illustrative purposes. Therefore, the number of folding axes which the electronic device 101 can have is not limited.

According to an embodiment, the display (e.g., the display module 160 in FIG. 1) may be folded or unfolded in various types (e.g., in-folding, out-folding), or in/out folding) depending on the implemented type of the electronic device 101. According to an embodiment, the electronic device 101 may include various foldable types such as longitudinally foldable, transversely foldable, G-foldable, or Z-foldable types.

Figure 4A:
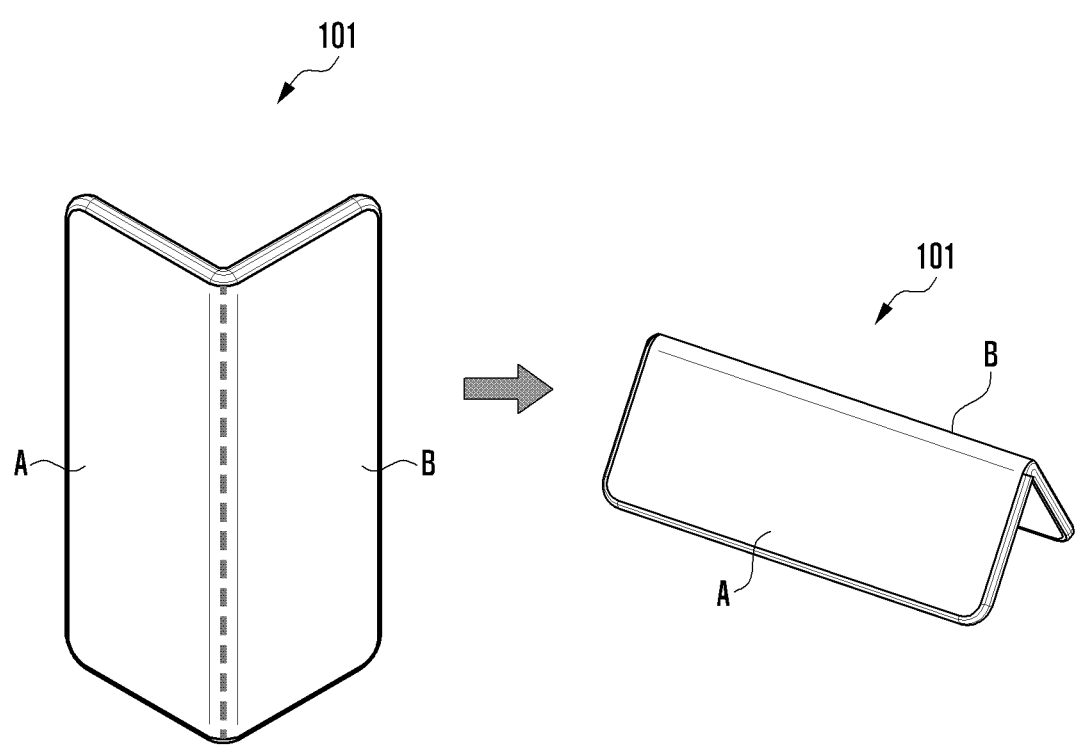
FIGS. 4A and 4B are diagrams illustrating examples of changing the mode of an electronic device according to various embodiments.
Figure 4B:
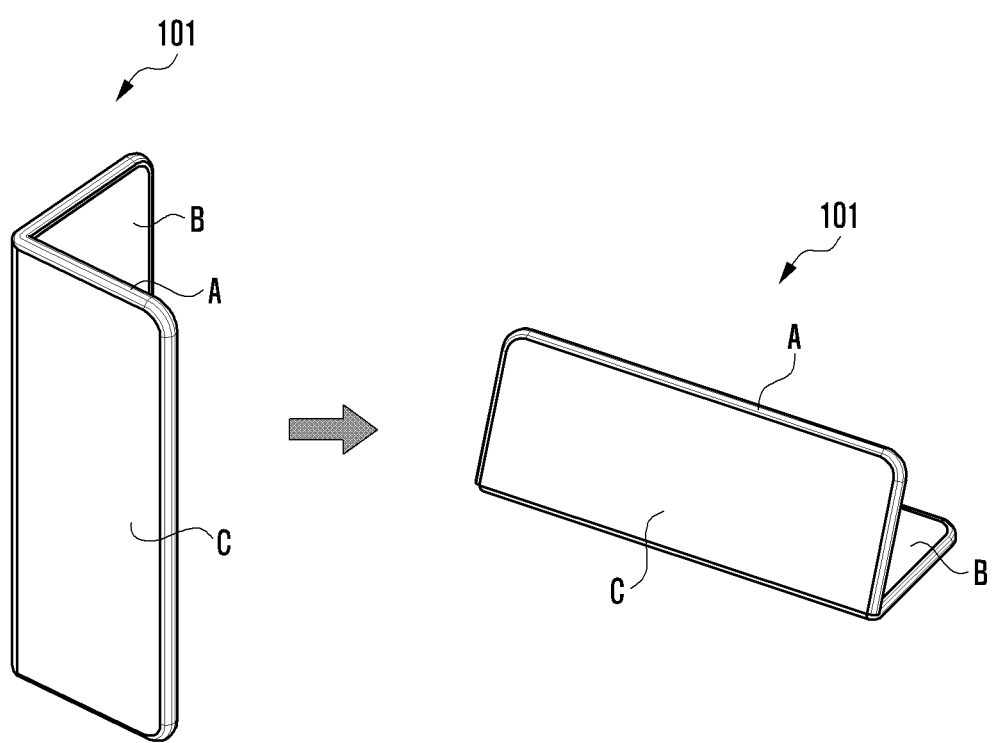

FIGS. 4A and 4B are diagrams illustrating examples of changing the mode of an electronic device according to various embodiments.

According to various embodiments, an electronic device 101 may include a foldable device which can be folded and unfolded. According to various embodiments, the electronic device 101 may have a folding (or bending) display (e.g., a foldable display or a flexible display) mounted thereon, and may be used while being folded or unfolded.

According to an embodiment, when folded (e.g., a folded state), an electronic device 101 of an out-folding type may be in a closed state while a first part and a second part of a housing (e.g., a cover) are brought into at least partial contact with each other with reference to a point (e.g., a folding axis or a hinge axis) at which the electronic device 101 is folded. According to an embodiment, when unfolded (e.g., an unfolded state), the electronic device 101 may provide all display surfaces (or regions) of a display as a single surface (or an entire surface), thereby using the display in a relatively large size.

According to an embodiment, when folded (e.g., a folded state), an electronic device 101 of an in-folding type may be in a closed state while a first display surface (or a first region) and a second display surface (or a second region) of a display are brought into at least partial contact with each other with reference to a point (e.g., a folding axis or a hinge axis) at which the electronic device 101 is folded. According to an embodiment, when unfolded (e.g., an unfolded state), the electronic device 101 may provide all display surfaces (or regions) of the display as a single surface (or an entire surface), thereby using the display in a relatively large size.

Although not illustrated, when folded, an electronic device 101 of an in/out-folding type may be in a closed state while a first part and a second part of a housing (e.g., a cover) are brought into at least partial contact with each other with reference to a first point (e.g., a first folding axis) at which the electronic device 101 is folded, and while a first display surface (or a first region) and a second display surface (or a second region) of a display are brought into at least partial contact with each other with reference to a second point (e.g., a second folding axis) at which the electronic device 101 is folded. According to an embodiment, when unfolded, the electronic device 101 may provide all display surfaces (or regions) of the display as a single surface (or an entire surface), thereby using the display in a relatively large size.

According to an embodiment, FIGS. 4A and 4B may show a state in which the electronic device 101 is folded to a predetermined angle (e.g., in an intermediated state). For example, the electronic device 101 may be manually switched in the state change (e.g., a folded state, an intermediate state) of the display module 160. In various embodiments, as illustrated in 4A and 4B, the electronic device 101 may operate in a designated mode (e.g., a tent mode in FIG. 4A or a flex mode in FIG. 4B) in which the same operates in an intermediate state. For example, it is disclosed that the electronic device 101 is divided into at least two display surfaces and provides a control panel through each display surface during operation thereof.

According to an embodiment, the designated mode may include a mode (e.g., a tent mode or a flex mode) in which a screen is split in at least two directions by folding the electronic device 101 to a predetermined extent. According to an embodiment, for example, as illustrated in FIG. 4A, the tent mode may include a mode in which the electronic device 101 is used in a tent shape while being folded to a predetermined angle, and thus a first display surface (A) and a second display surface (B), visible to or facing the outside, are separately used. According to an embodiment, for example, as illustrated in FIG. 4B, the flex mode may include a mode in which the electronic device 101 is used in a state where one surface of the electronic device 101 faces a floor or is placed on the floor while the electronic device 101 is folded to a predetermined angle, and thus a first display surface (A) and/or a second display surface (B), facing inside, and a third display surface (C), visible or facing the outside, are separately used.

According to various embodiments, the electronic device 101, as illustrated in FIG. 3 and FIG. 4A or 4B, may include a processor (e.g., the processor 120 in FIG. 1) and one display driver IC (DDI) (e.g., the DDI 230 in FIG. 2) operatively or electrically connected to the display module 160. For example, a first display surface and a second display surface may be connected to one DDI. Various embodiments are not limited thereto, and the electronic device 101 may include a first DDI operatively or electrically connected to the first display surface, and a second DDI operatively or electrically connected to the second display surface. According to various embodiments, the first display surface and the second display surface may be operatively or electrically connected to each other, and may be formed as a single display (e.g., a foldable display or a flexible display).

Figure 5:
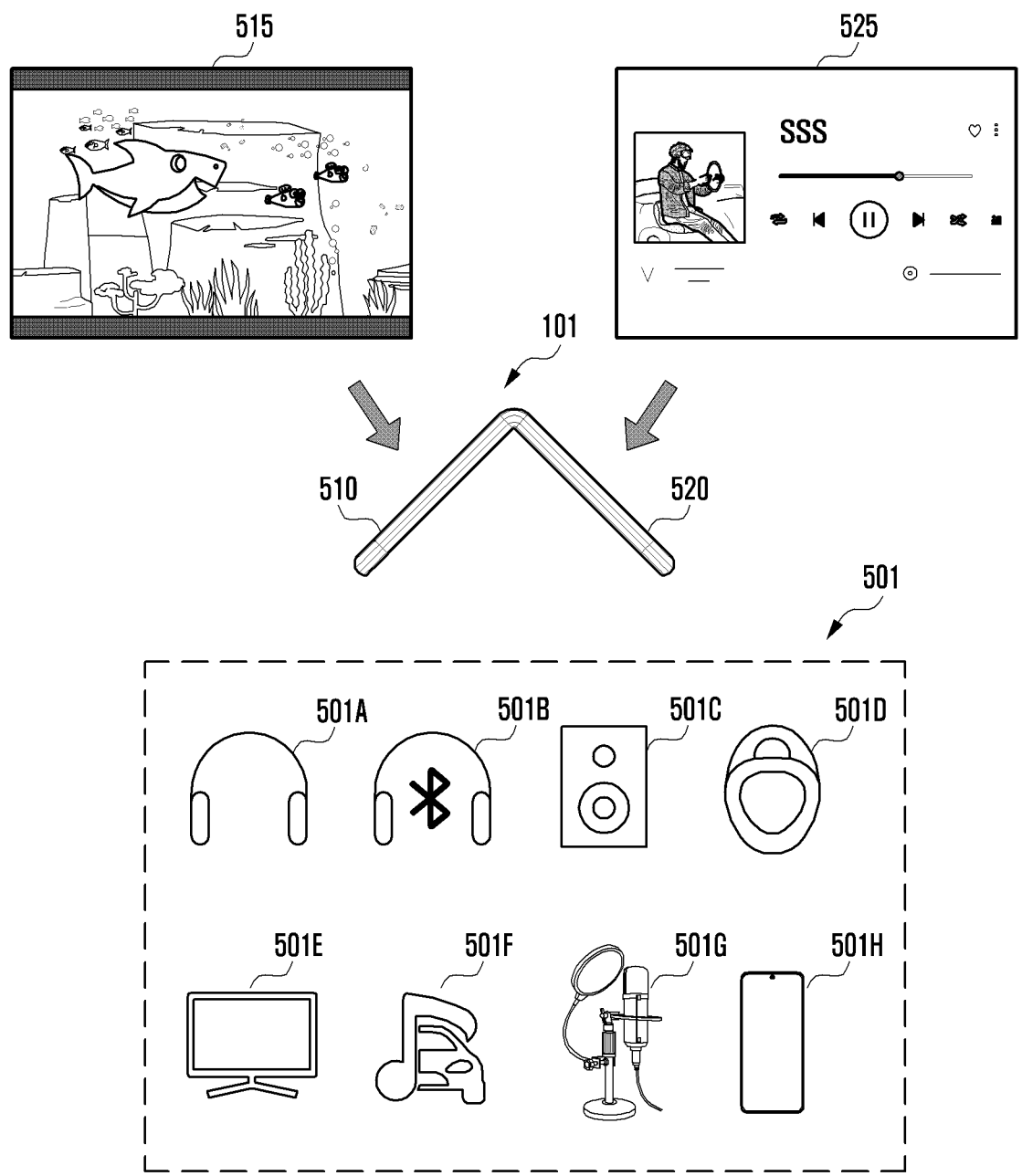
FIG. 5 is a diagram illustrating an example of an operation by interaction between an external device and an electronic device according to various embodiments.

FIG. 5 is a diagram illustrating an example of an operation by interaction between an external device and an electronic device according to various embodiments.

According to an embodiment, FIG. 5 may show an example in which an electronic device 101 and an external device 501 (or a peripheral device) are connected to each other through designated communication and the electronic device 101 switches from a first state (e.g., an unfolded state) to a second state (e.g., a predetermined angle folded state) (e.g., enters a mode). According to an embodiment, the electronic device 101 may operate through screen splitting when entering a designated mode (e.g., a tent mode) as in the second state. For example, FIG. 5 may show an example of switching to a mode (e.g., a tent mode) in which a user sets up the electronic device 101 to cause two display surfaces 510 and 520 to face different directions, and uses all of the two display surfaces 510 and 520.

According to an embodiment, the user may separately use the two display surfaces 510 and 520 using the electronic device 101 in the tent mode. The electronic device 101 may screen-split, based on tent mode entering, the display module 160 into a first display surface 510 (or a first region) and a second display surface 520 (or a second region). According to an embodiment, the electronic device 101 may display, through the split first display surface 510, an execution screen 515 (or a first user interface) of a first application corresponding thereto. According to an embodiment, the electronic device 101 may display, through the second display surface 520, an execution screen 525 (or a second user interface) of a second application that is identical to or different from the first application. For example, the electronic device 101 may be used through screen splitting such that the first display surface 510 faces the user and the second display surface 520 faces the opposite direction of the user.

According to an embodiment, the electronic device 101 may be connected to various external devices 501 through direct (e.g., wired) communication or wireless communication (e.g., out-of-band (OOB) communication). According to an embodiment, the external devices 501 may include various devices such as a wired headphone 501A, a wireless headphone 501B, a speaker 501C, an earbud 501D, a display device 501E (e.g., TV), an external audio device 501F (e.g., a car audio device), an artificial intelligence IoT device 501G, and/or another electronic device 501H (e.g., a smartphone and/or a laptop PC).

The external device 501 according to an embodiment may include, for example, various types of devices which are connected to the electronic device 101 through designated communication and have a function of transmitting or receiving data related to services (or functions) of the electronic device 101. For example, the external device 501 may receive data (or information) (e.g., audio data and/or image data (e.g., images, videos, and/or streaming data) from the electronic device 101 through designated communication, and may output and provide the received data in the form of auditory information and/or visual information. According to an embodiment, the external device 501 may include all or at least some of, for example, the corresponding elements described with reference to FIG. 1.

According to an embodiment, the electronic device 101 may be connected to the external device 501 in a one-to-one or one-to-many relationship. According to an embodiment, the electronic device 101 may display, based on a tent mode (or screen splitting), a related user interface (or visual information) through at least one display surface 510 and/or 520 used by the user, and, in order to output related data (e.g., audio data and/or image data) through a connected external device 501, may transmit the related data to the external device 501.

According to an embodiment, when entering a designated mode (e.g., a tent mode, a flex mode, or a screen splitting mode), the electronic device 101 may display different user interfaces (or execution screens) (e.g., the first user interface 515 and the second user interface 525) on different separate display surfaces (e.g., 510 and 520), respectively. For example, the electronic device 101 may display the first user interface 515 through the first display surface 510, and may display the second user interface 525 through the second display surface 520.

According to an embodiment, when entering the designated mode, the electronic device 101 may automatically provide, based at least partially on the state of use of the first display surface 510 and the second display surface 520 and/or the connection state of the external device 501, corresponding user interfaces (e.g., control panels), capable of changing (or adjusting or controlling) attributes (or functions) (e.g., sound path, display brightness, audio volume, or screen mirroring) related to the corresponding display surfaces, through at least one of the first display surface 510 and/or the second display surface 520.

According to an embodiment, the attributes related the display surfaces 510 and 520 or changing of the attributes may indicate, for example, changing of one or more configurations of the electronic device 101, controlling of functions of an application executed on each of the split display surfaces, and/or changing (or controlling or adjusting) of functions and/or configurations of one or more external devices 501 connected to the electronic device 101, which are based a control panel corresponding to each of the split display surfaces, when the electronic device 101 operates in the designated mode.

According to an embodiment, the control panel may include, for example, a volume control panel, a sound path control panel, a display brightness control panel, and/or a mirroring control panel, but is not limited thereto. An operation of separately providing a control panel for each display surface, according to an embodiment, will be described with reference to the drawings described later.

According to an embodiment, when the user uses the electronic device 101 while splitting the electronic device 101 into at least two screens based on a designated mode (e.g., a tent mode, a flex mode, or a screen splitting mode), the user may easily perform, through a control panel automatically provided to correspond to each split screen, an attribute change related to the corresponding screen compared with a conventional case.

An electronic device according to an example embodiment of the disclosure may include: a display module including a display and a processor operatively connected to the display module, wherein the processor is configured to: sense execution of a designated mode in which the electronic device switches from a first state to a second state while a designated user interface is displayed as a full screen, perform, based on the sensing of entering the designated mode, screen splitting wherein the full screen is split into a first display surface and a second display surface, display designated user interfaces on the first display surface and the second display surface, respectively, and separately provide, based on the user interfaces of the first display surface and/or the second display surface, control panels related to the corresponding display surfaces.

According to an example embodiment, the processor may be configured to: provide, through the first display surface, a first control panel for changing an attribute related to the first display surface, and provide, through the second display surface, a second control panel for changing an attribute related to the second display surface, wherein the first control panel and the second control panel may operate independently of each other on the corresponding display surfaces.

According to an example embodiment, the processor may be configured to provide a control panel through at least one of the first display surface and/or the second display surface, based at least on the state of use of the first display surface and the second display surface and/or the connection state of an external device.

According to an example embodiment, the changing of the attributes related to the display surfaces may include changing of configuration of the electronic device, controlling functions of applications executed through the first display surface and the second display surface, and/or changing of functions and/or configurations of one or more external devices connected to the electronic device, based on the control panels corresponding to the first display surface and the second display surface, respectively, based on the electronic device operating in the designated mode.

According to an example embodiment, the processor may be configured to: determine, based on the sensing of execution of the designated mode, whether the electronic device is interacting with an external device, determine device information of the external device based on the electronic device interacting with the external device, determine situation information according to the interaction with the external device, and separately provide a control panel for each display surface, based on the device information and/or the situation information.

According to an example embodiment, the situation information may include operation information related to a display surface interacting with the external device and/or a function operating between the electronic device and the external device, and execution information related to an application executed through each split display surface.

According to an example embodiment, the processor may be configured to: determine a first control panel for the first display surface, based on situation information related to the first display surface, and determine a second control panel for the second display surface, based on situation information related to the second display surface.

According to an example embodiment, the processor may be configured to: determine execution information related to each split display surface based on the electronic device not interacting with the external device, and separately provide a control panel for each display surface, based on the execution information.

According to an example embodiment, the processor may be configured to: determine the first control panel for the first display surface, based on execution information related to the first display surface, and determine the second control panel for the second display surface, based on execution information related to the second display surface.

According to an example embodiment, the control panels may include a volume control panel, a sound path control panel, a display brightness control panel, and/or a mirroring control panel.

According to an example embodiment, the designated mode may include a tent mode, a flex mode, and/or a screen splitting mode.

Hereinafter, example methods of operating the electronic device 101 will be described in greater detail. Operations performed by the electronic device 101, described below, may be performed by the processor 120 including at least one processing circuitry of the electronic device 101. According to an embodiment, the operations performed by the electronic device 101 may be performed by instructions which are stored in the memory 130 and, which, when executed, cause the processor 120 to perform various operations.

Figure 6:
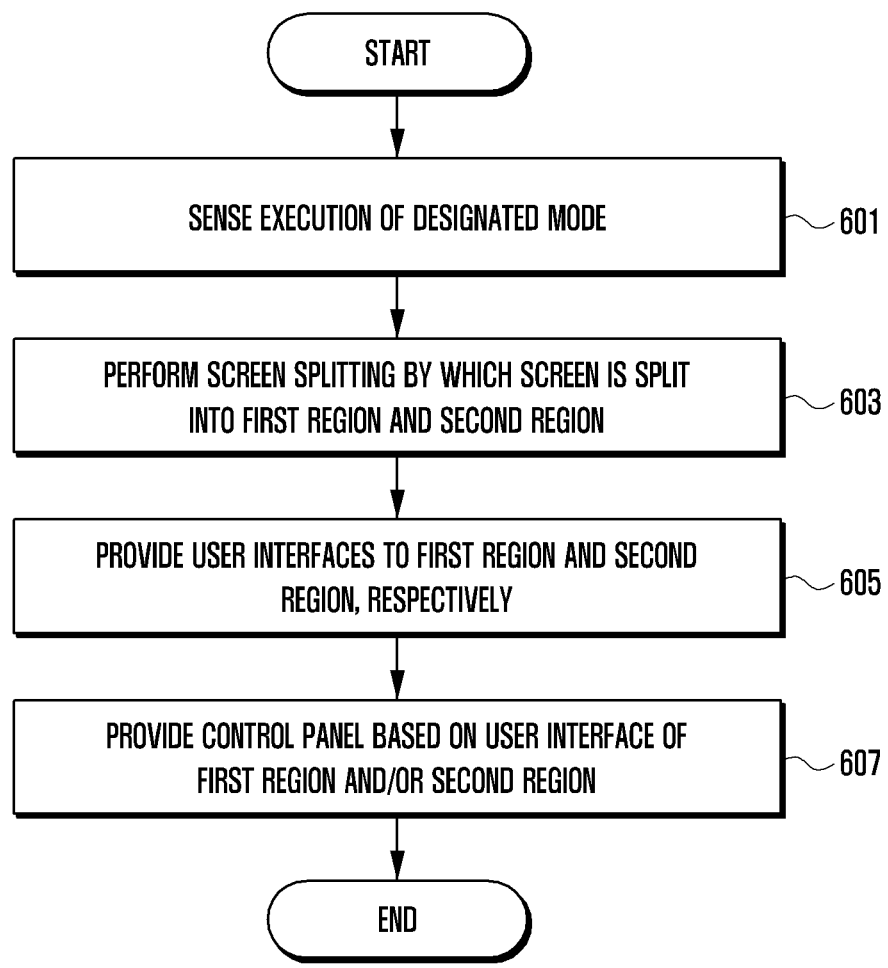
FIG. 6 is a flowchart illustrating an example method of operating an electronic device according to various embodiments.
Figure 7:
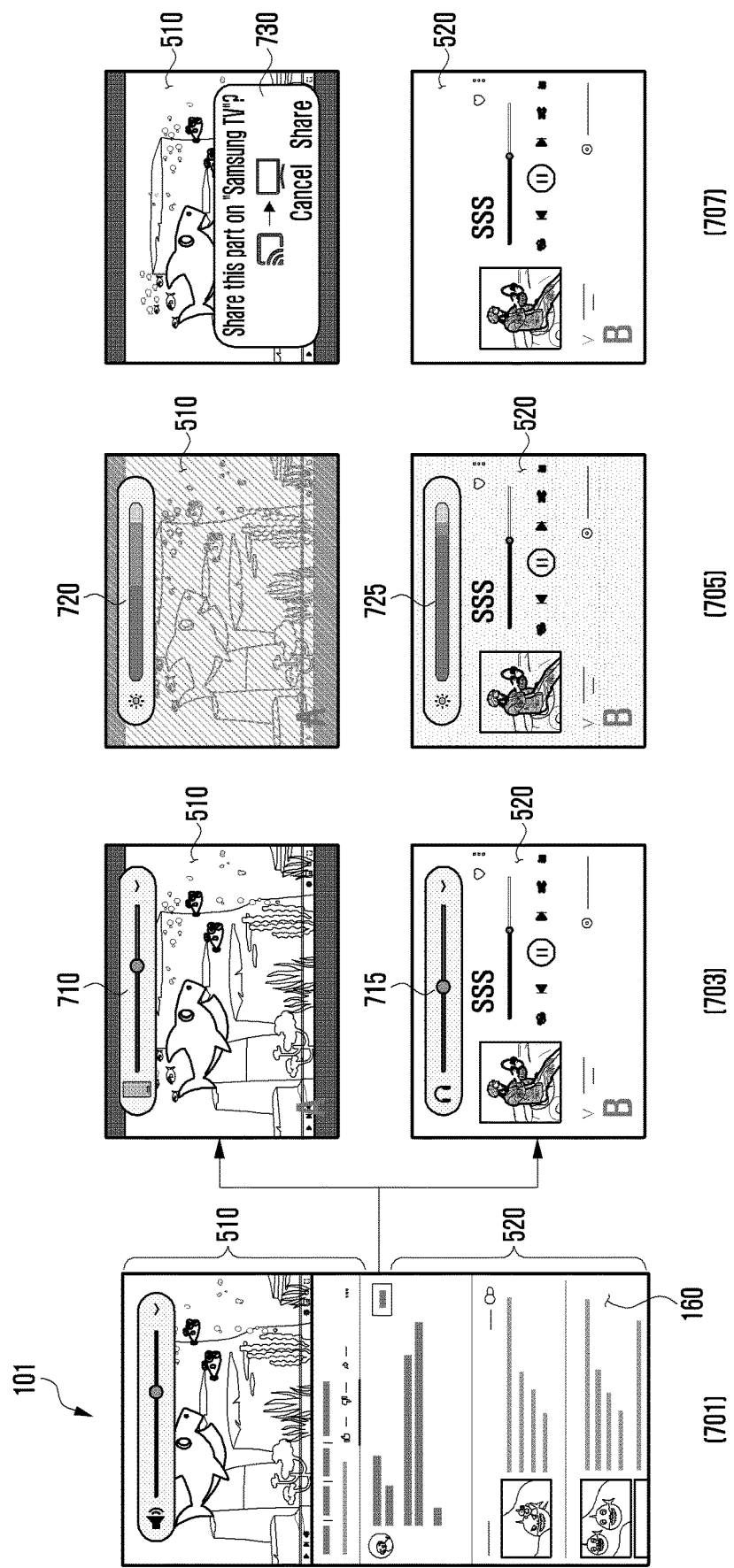
FIG. 7 is a diagram illustrating an example of a user interface provided based on a mode change in an electronic device according to various embodiments.

FIG. 6 is a flowchart illustrating an example method of operating an electronic device according to various embodiments. FIG. 7 is a diagram illustrating an example of a user interface provided based on a mode change in an electronic device according to various embodiments.

Referring to FIG. 6, in operation 601, the processor 120 of the electronic device 101 may sense execution of (entry into) a designated mode (e.g., a tent mode, a flex mode, or a screen splitting mode).

According to an embodiment, referring to FIG. 7, as shown in illustration 701, the processor 120 may display an execution screen (or a user interface) of a first application on the full screen of the display module 160. According to an embodiment, the processor 120 may sense an execution of a designated mode (e.g., a tent mode, a flex mode, or a screen splitting mode) in which while an execution screen of an application is displayed on the full screen of the display module 160, the electronic device 101 switches from a first state (e.g., an unfolded state) to a second state (e.g., a predetermined angle folded state).

In operation 603, the processor 120 may perform screen splitting by which a screen is split into a first region (e.g., a first display surface 510 in FIG. 7) and a second region (e.g., a second display surface 520 in FIG. 7). According to an embodiment, the processor 120 may perform, based on sensing the switching of the state of the electronic device 101, screen splitting by which the full screen is split into the first region and the second region. According to an embodiment, the processor 120 may control the display module 160 to display an execution screen of an application, based on a multi-window.

According to an embodiment, the processor 120 may execute (e.g., multitasking) at least two applications based on the sensing of the execution of the designated mode (or the sensing of state stitching). According to an embodiment, the processor 120 may split the screen of the display module 160 based on the at least two applications, and may provide a multi-window including at least two regions (e.g., the first region and the second region) corresponding to the executed application.

In operation 605, the processor 120 may provide designated user interfaces to the first region and the second region, respectively. According to an embodiment, the processor 120 may control the display module 160 to display execution screens of applications in the respective regions of the multi-window.

According to an embodiment, referring to FIG. 7, as shown in illustrations 703, 705, and/or 707, the processor 120 may control the display module 160 to display an execution screen (or a first user interface) of a first application through the first display surface 510 and to display an execution screen of a second application, which is identical to or different from the first application, through the second display surface 520.

According to an embodiment, illustration 701 in FIG. 7 may show an example in which an execution screen of an application is operated (e.g., displayed as a full screen) based on at least one window of the display module 160 in the electronic device 101. According to an embodiment, in the electronic device 101, the maximum number of split screens may vary depending on the size of the screen of the display module 160.

For example, the electronic device 101 may display, based on one window (or a single window), one execution screen corresponding to an application.

In another example, the electronic device 101 may display, based on a 2-split multi-window (e.g., the first display surface 510 and the second display surface 520), two different execution screens which correspond to two applications, respectively. For example, the electronic device 101 may display a first execution screen of a first application through the first display surface 510 while displaying a second execution screen of a second application, which is identical to or different from the first application, through the second display surface 520.

In another example, the electronic device 101 may display, based on a 3-split multi-window (e.g., the first display surface 510, the second display surface 520, and the third display surface (not shown)), three different execution screens which correspond to three applications, respectively.

According to an embodiment, the electronic device 101 may provide, based on a form factor of the electronic device 101 and/or the screen size of the display module 160, split screens (or multi-window) by a single, 2-splitting, 3-splitting, and/or N-splitting. According to an embodiment, the electronic device 101 may provide, based on multi-window, execution screens of multiple different applications, and may provide, based on a trigger operating as a multi-window, control panels through respective corresponding display surfaces.

In operation 607, the processor 120 may provide, based on user interfaces of the first region and/or the second region, control panels associated with the respective regions.

According to an embodiment, referring to FIG. 7, as shown in illustration 703, illustration 705, and/or illustration 707, the processor 120 may provide, through at least one display surface, respective control panels 710, 720 and 730 capable of changing (or adjusting or controlling) attributes (or functions) (e.g., sound path, display brightness, audio volume, or screen mirroring) related to the corresponding display surfaces.

For example, illustrations 703>and 705 may show an example in which the first display surface 510 and the second display surface 520 are provided with corresponding control panels 710, 715, 720, and 725, and illustration 707 may show an example in which the first display surface 510 is provided with a corresponding control panel 730 but the second display surface 520 is not provided with a control panel.

According to an embodiment, illustration 703 in FIG. 7 may show an example, volume control panels 710 and 715, capable of adjusting output sound of audio data related to applications executed through the first display surface 510 and the second display surface 520, are provided to the first display surface 510 and the second display surface 520, respectively.

According to an embodiment, illustration 705 in FIG. 7 may show an example in which display brightness control panels 720 and 725, capable of adjusting the screen brightness of the first display surface 510 and the second display surface 520, are provided to the first display surface 510 and the second display surface 520, respectively.

According to an embodiment, illustration 707 in FIG. 7 may show an example in which, when a display surface associated with an external device (e.g., TV) connected to the electronic device 101 is the first display surface 510, a mirroring control panel 730 capable of performing interaction (e.g., screen mirroring) with the external device is provided through the first display surface 510.

According to an embodiment, the processor 120 may automatically or separately provide, based at least partially on the state of use of the first display surface 510 and the second display surface 520 and/or the connection state of an external device, control panels, capable of changing (or adjusting or controlling) attributes (or functions) related to the corresponding display surfaces, through at least one of the first display surface 510 and/or the second display surface 520.

According to an embodiment, the control panels may include, for example, a volume control panel, a sound path control panel, a display brightness control panel, and/or a mirroring control panel, but are not limited thereto. A control panel and an operation of providing the same, according to an embodiment, will be described with reference to the drawings described later.

Figure 8:
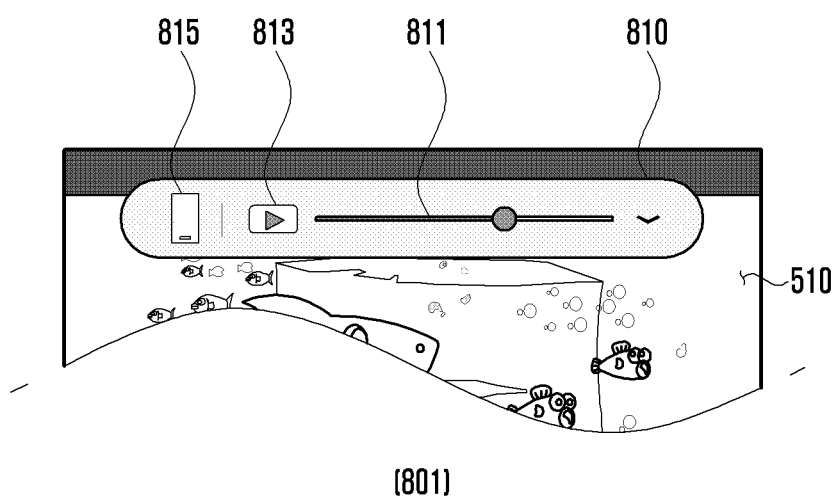
FIG. 8 is a diagram illustrating an example of a control panel in an electronic device according to various embodiments.
Figure 8:
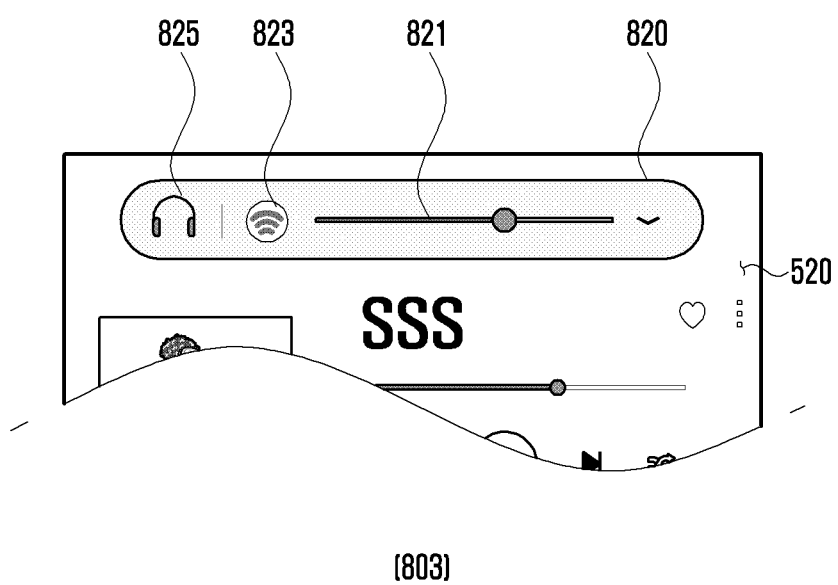

FIG. 8 is a diagram illustrating an example of a control panel in an electronic device according to various embodiments.

Referring to FIG. 8, FIG. 8 may show an example in which the electronic device 101 and an external device are connected to each other through designated communication and in which, when the electronic device 101 switches from a first state (e.g., an unfolded state) to a second state (e.g., a predetermined angle folded state) (e.g., enters a designated mode), the electronic device 101 provides, based on screen splitting, control panels 810 and 820 through a first display surface 510 and a second display surface 520, respectively.

According to an embodiment, illustration 801 may show an example in which an execution screen (or a first user interface) of a first application is displayed through the first display surface 510 and in which a first control panel 810 associated with the first display surface 510 is displayed based on the execution screen (or the first user interface) of the first application.

According to an embodiment, illustration 803 may show an example in which an execution screen (or a second user interface) of a second application that is identical to or different from the first application is displayed through the second display surface 520 and in which the second control panel 820 associated with the second display surface 520 is displayed based on the execution screen (or the second user interface) of the second application.

According to an embodiment, the control panel 810 and 820 may be provided while including objects 811 and 821 (e.g., control objects) capable of changing (or adjusting or controlling) attributes (or functions) (e.g., sound path, display brightness, audio volume, or screen mirroring) related to the corresponding display surfaces, in addition to second objects 813 and 823 and third objects 815 and 825. In an embodiment, the second objects 813 and 823 may include an object (e.g., an application object, for example, an identifier or a representative icon) indicating application information for identifying an application executed through a corresponding display surface. In an embodiment, the third objects 815 and 825 may include an object (e.g., a device object, for example, a device icon) indicating device information for identifying a device (e.g., an internal speaker or an external device) interacting with a corresponding display surface.

According to an embodiment, the first control panel 810 for the first display surface 510 and the second control panel 820 for the second display surface 520 may operate on the corresponding display surface, independently of other control panels. For example, the first control panel 810 may operate to change attributes related to the first display surface 510, and the second control panel 820 may operate to change attributes related to the second display surface 520.

According to an embodiment, the first control panel 810 or the second control panel 820 may operate on a corresponding display surface while interacting with other control panels. For example, the first control panel 810 or the second control panel 820 may be integrated with the corresponding display surface, and may operate to separately change attributes related to the first display surface 510 and the second display surface 520.

According to an embodiment, illustrations in FIG. 8 may show an example in which an external device (e.g., a headset) is associated with the second display surface 520. For example, FIG. 8 may show an example in which a connection is made such that data (e.g., audio data) related to the second application displayed on the second display surface 520 is output through an external device.

According to an embodiment, the electronic device 101 may provide the corresponding control panels 810 and 820 to the first display surface 510 and the second display surface 520, respectively, based at least partially on the state of use of the first display surface 510 and the second display surface 520 and/or the connection state of an external device.

For example, as shown in illustration 801, the electronic device 101 may include, in the control panel 810 related to the first display surface 510, a first control object 811 for control (e.g., volume control) of the first display surface 510 or the first application on the first display surface 510, a first application object 813 related to the first application that is being executed (or is subject to function control) through the first display surface 510, and a first device object 815 (e.g., a device icon indicating an internal speaker) related to interaction (e.g., a device for outputting audio data of the first application) with the first display surface 510.

In another example, as shown in illustration 803, the electronic device 101 may include, in the second control panel 820 related to the second display surface 520, a second control object 821 for control (e.g., volume control) of the second display surface 520 or the second application on the second display surface 520, a second application object 823 related to the second application that is being executed (or is subject to function control) through the second display surface 520, and a second device object 825 (e.g., a device icon indicating an external device (e.g., a headset)) related to interaction (e.g., a device for outputting audio data of the second application) with the second display surface 520.

As illustrated in FIG. 8, according to an embodiment, when the electronic device 101 operates in the designated mode, the electronic device 101 may provide, to respective split screens (e.g., the first display surface 510 and the second display surface 520), control panels associated with the corresponding display surfaces, based at least partially on the state of use of each display surface and/or the connection state of an external device.

Figure 9:
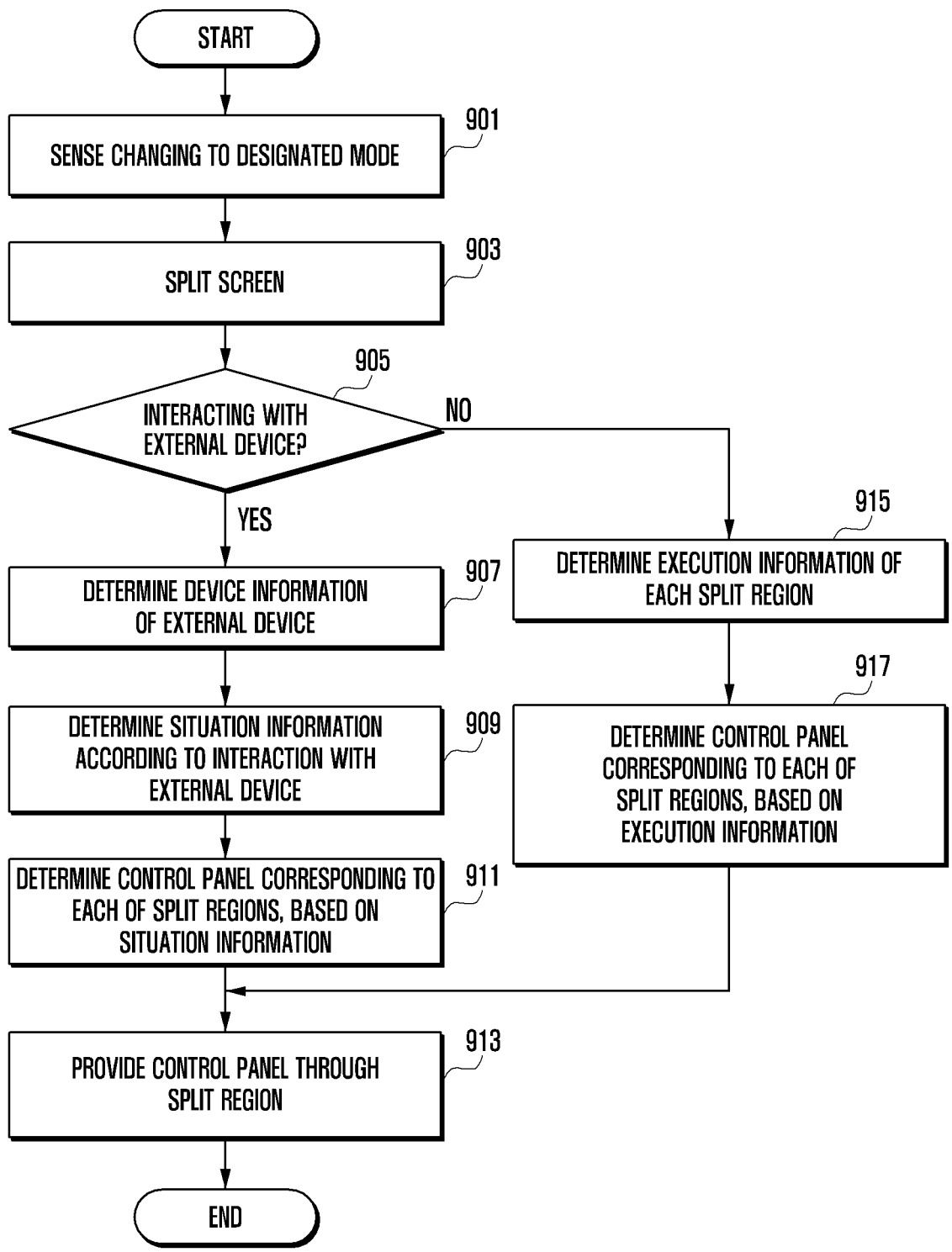
FIG. 9 is a flowchart illustrating an example method of operating an electronic device according to various embodiments.

FIG. 9 is a flowchart illustrating an example method of operating an electronic device according to various embodiments.

Referring to FIG. 9, in operation 901, the processor 120 of the electronic device 101 may sense that the electronic device 101 switches to a designated mode (e.g., a tent mode, a flex mode, or a screen splitting mode). According to an embodiment, the processor 120 may sense, while an execution screen (or a user interface) of an application is displayed as a full screen of the display module 160, execution of a designated mode (e.g., a tent mode, a flex mode, or a screen splitting mode) in which the electronic device 101 switches from a first state (e.g., an unfolded state) to a second state (e.g., a predetermined angle folded state).

In operation 903, the processor 120 may perform screen splitting. According to an embodiment, the processor 120 may perform screen splitting by which a screen is split into a first region (e.g., the first display surface 510 in FIG. 5) and a second region (e.g., the second display surface 520 in FIG. 5). According to an embodiment, the processor 120 may perform, based on the sensing of execution of the designation mode (or the sensing of switching of the state) of the electronic device 101, screen splitting by which the full screen is split into the first region and the second region.

In operation 905, the processor 120 may determine whether the electronic device 101 is interacting with an external device (e.g., the external device 501 in FIG. 5).

According to an embodiment, the processor 120 may determine, based on the sensing of execution of the designated mode of the electronic device 101, whether the electronic device 101 is connected to at least one external device 501 and/or whether the electronic device 101 is performing data communication (e.g., data transmission or data outputting) through the connected external device 501. According to an embodiment, the electronic device 101 may be connected to at least one external device 501 through a direct (e.g., wired) communication or wireless communication (e.g., OOB communication) using a communication module (e.g., the communication module 190 in FIG. 1). According to an embodiment, the OOB communication may include, for example, BLE, NFC, ultra-wide band (UWB), Zigbee, and/or Wi-Fi 2.4 GHz communication.

When the electronic device 101 is interacting with the external device 501 in operation 905 (e.g., "Yes" in operation 905), the processor 120 may determine device information of the external device 501 in operation 907. According to an embodiment, the external device 501 may include various devices, for example, a wired headphone, a wireless headphone, a speaker, an earbud, a display device, an external audio device, an artificial intelligence IoT device, and/or other electronic devices (e.g., a smartphone and/or a laptop PC). According to an embodiment, the processor 120 may identify the type of the connected external device 501 based on the device information (e.g., a device identifier) of the external device 501.

In operation 909, the processor 120 may determine situation information according to interaction with the external device 501. According to an embodiment, the situation information may include, for example, operation information (or function information) related to the type of connection with the external device 501 (e.g., a display surface interacting the external device) and/or functions operating (or interacting) between the electronic device 101 and the external device 501, and execution information (or executed-application classification information) related to application executed through respective regions resulting from screen splitting. The situation information according to an embodiment will be described with reference to the drawings described later.

In operation 911, the processor 120 may determine, based the situation information, a control panel that correspond to each of the split regions. According to an embodiment, the processor 120 may determine a first control panel for the first display surface 510 based on situation information related to the first display surface 510. According to an embodiment, the processor 120 may determine a second control panel for the second display surface 520 based on situation information related to the second display surface 520. An operation of separately providing, based on the situation information, a control panel for each display surface, according to an embodiment, will be described with reference to the drawings described later.

In operation 913, the processor 120 may provide the control panels through the split regions. According to an embodiment, the processor 120 may provide, through the first display surface 510, the first control panel related to first display surface 510-based operations (e.g., first application function control, external device function control, and/or a configuration related to the first display surface). According to an embodiment, the processor 120 may provide, through the second display surface 520, the second control panel related to second display surface 520-based operations (e.g., second application function control, external device function control, and/or a configuration related to the second display surface).

When the electronic device 101 is not interacting with the external device 501 in operation 907 (e.g., "No" in operation 905), the processor 120 may determine execution information of each split region in operation 915. According to an embodiment, the processor 120 may determine execution information (e.g., executed-application classification information) related to applications executed in respective regions resulting from screen splitting.

In operation 917, the processor 120 may determine, based on the execution information, a control panel corresponding to each of the split regions. According to an embodiment, the processor 120 may determine a first control panel for the first display surface 510 based on execution information related to the first display surface 510. According to an embodiment, the processor 120 may determine a second control panel for the second display surface 520 based on execution information related to the second display surface 520. An operation of separately providing, based on the execution information, a control panel for each display surface, according to an embodiment, will be described with reference to the drawings described later.

In operation 913, the processor 120 may provide the control panels through the split regions. According to an embodiment, the processor 120 may provide, through the first display surface 510, the first control panel related to first display surface 510-based operations (e.g., first application function control and/or a configuration related to the first display surface). According to an embodiment, the processor 120 may provide, through the second display surface 520, the second control panel related to second display surface 520-based operations (e.g., second application function control and/or a configuration related to the second display surface).

Figure 10:
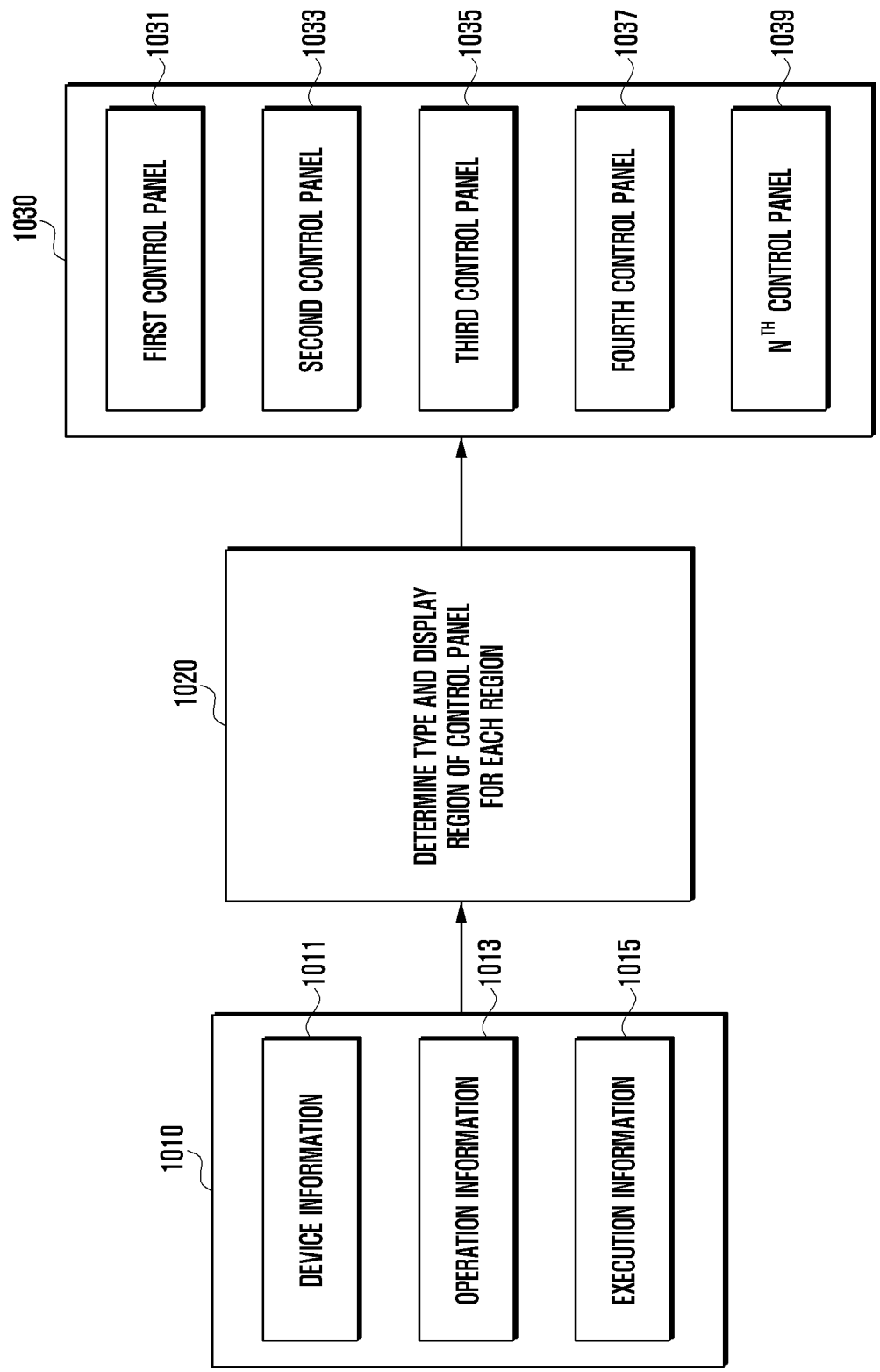
FIG. 10 is a diagram illustrating an example of an operation of providing a control panel in an electronic device according to various embodiments.

FIG. 10 is a diagram illustrating an example operation of providing a control panel in an electronic device according to various embodiments.

According to an embodiment, FIG. 10 may show an example in which the electronic device 101 and at least one external device 501 are connected to each other through designated communication and in which, when the electronic device 101 enter a designated mode, in which the electronic device 101 switches from a first state (e.g., an unfolded state) to a second state (e.g., a predetermined angle folded state), a separate control panel is provided to each display surface based on device information and/or situation information (e.g., or operation information and/or execution information).

Referring to FIG. 10, the electronic device 101 may determine a control panel 1030 for each of display surfaces (e.g., the first display surface 510 and the second display surface 520), based on various pieces of collected information 1010 collected (or identified) internally in the electronic device 101 or externally according to interaction with the external device 501.

According to an embodiment, the collected information 1010 may include device information 1011 related to the external device 501, operation information 1013 related to the type of connection with the external device 501 (e.g., a display surface interacting with an external device) and/or functions operation (or interacting) between the electronic device 101 and the external device 501, and execution information 1015 (e.g., executed-application classification information) related to applications executed in respective regions resulting from screen splitting. According to an embodiment, the operation information 1013 may include direction information related a display surface corresponding to the position (or positioned direction) of a target object (e.g., a user and/or the external device 501), connection information related to a display surface at a position in which the external device 501 is connected, and/or distance information related to a display surface close to each external device 501, but is not limited thereto.

According to an embodiment, the electronic device 101 may determine, based on at least one piece of the collected information 1010, such as the device information 1011, the operation information 1013, and/or the execution information 1015, the type of a control panel 1030 for each split region and/or at least one display region (e.g., at least one display surface) in which the control panel 1030 is to be displayed (1020). According to an embodiment, the electronic device 101 may analyze the collected information 1010, may determine, based on the analysis result, at least one display surface (e.g., the first display surface 510 and/or the second display surface 520) to be provided with the control panel 1030, and may determine, for each display surface, the control panel 1030 which is to be displayed through the determined display surface.

According to an embodiment, the control panel 1030 may include N (N is a natural number) control panels designated by the electronic device 101. For example, a first control panel 1031 (e.g., a volume control panel), a second control panel 1033 (e.g., a sound path control panel), a third control panel 1035 (e.g., a display brightness control panel), a fourth control panel 1037 (e.g., a mirroring control panel), and/or a $N^{th}$ control panel 1039 (e.g., a configuration control panel), but is not limited thereto.

Hereinafter, an operation scenario of providing a control panel for at least one display surface based on the collected information 1010, according to an embodiment, will be described in greater detail with reference to FIGS. 11, 12, 13, 14, 15 and 16.

Figure 11:
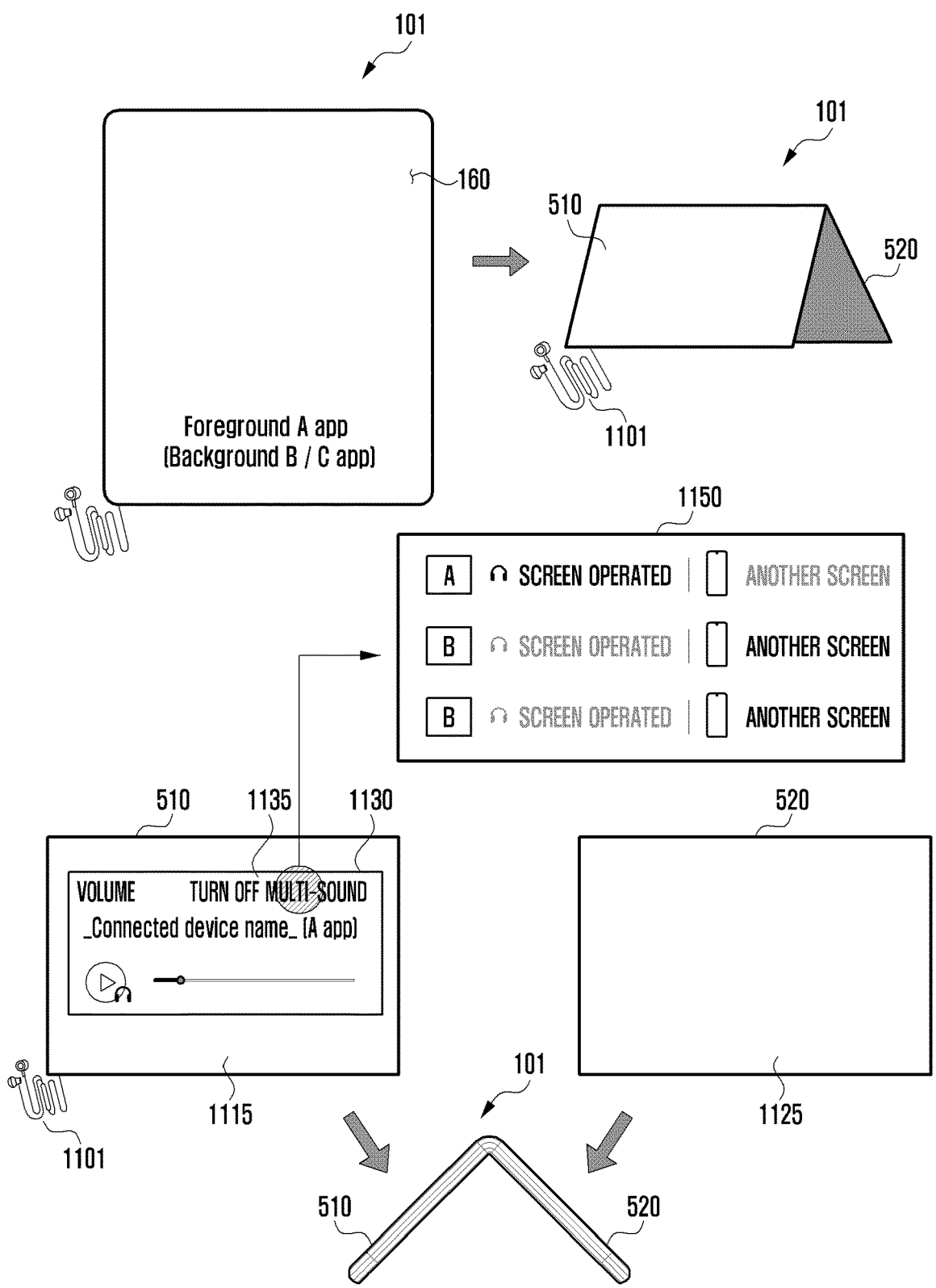
FIG. 11 is a diagram illustrating an example of a scenario of performing an operation based on a mode change in an electronic device according to various embodiments.

FIG. 11 is a diagram illustrating an example scenario of performing an operation based on a mode change in an electronic device according to various embodiments.

According to an embodiment, FIG. 11 may show an example in which an electronic device 101 and an external device 1101 (e.g., a wired earphone) are connected to each other through wired communication, and in which, when the electronic device 101 enters a designated mode (e.g., a tent mode) based on switching from a first state (e.g., an unfolded state) to a second state (e.g., a predetermined angle folded state), the electronic device 101 provides a control panel 1130 according to a sound path. According to an embodiment, the electronic device 101 may be configured such that a user folds the electronic device 101 to a predetermined extent to make two display surfaces (e.g., a first display surface 510 and a second display surface 520) face different directions and uses both the two display surfaces 510 and 520.

For example, when entering the designated mode, the electronic device 101 may display an execution screen 1115 (or the first user interface) of a first application through the first display surface 510, and may display an execution screen 1125 (e.g., a second user interface) of a second application through the second display surface 520. According to an embodiment, the first application may be a foreground application (e.g., an application executed in a first state). According to an embodiment, the second application may be an application designated by a user, or may be an application most recently executed among background applications. According to an embodiment, when the second application for the second display surface 520 is not defined, the electronic device 101 may display a designated second application (e.g., a home screen) through the second display surface 520, or may turn off and provide the second display surface 520.

According to an embodiment, FIG. 11 may show an example in which the control panel 1130 for volume control is provided through the first display surface 510 and/or the second display surface 520. According to an embodiment, in FIG. 11, the electronic device 101 may have multiple sound paths (e.g., a first path for output by the external device 1101 and a second path for speaker output of the electronic device 101). For example, the electronic device 101 may separately use multiple sound paths such as the first path and the second path. For example, the electronic device 101 may be configured to output audio data of the first application by the external device 1101 and to output audio data of the second application by a speaker of the electronic device 101.

According to an embodiment, the electronic device 101 may be configured such that a designated sound path is used in a designated mode, or may be configured such that a sound path is not designated in the designated mode.

According to an embodiment, the electronic device 101 may provide, when entering the designated mode, the control panel 1130 related to volume control of the external device 1101 to a display surface (e.g., the first display surface 510) corresponding (or close) to a direction (e.g., an earphone connection terminal part) to which the external device 1101 is wiredly connected. According to an embodiment, the electronic device 101 may provide a control panel (not shown) related to speaker volume control of the electronic device 101 to another undesignated display surface (e.g., the second display surface 520).

According to an embodiment, when entering the designated mode, if a designated sound path is configured (e.g., the external device 1101 is designated), the electronic device 101 may provide, for example, the control panel 1130 including a separate object 1135 for determining whether the sound path is activated.

For example, if the designated path is configured, when the electronic device 101 enters the designated mode, all of sound paths of the first application and the second application may be configured to be the external device 1101. In this case, the electronic device 101 may provide, when entering the designated mode, the control panel 1130 related to volume control of the external device 1101 to a display surface (e.g., the first display surface 510) corresponding (or close) to a direction (e.g., an earphone jack part) to which the external device 1101 is wiredly connected, and may provide, through the control panel 1130, the object 1135 for determining whether a speaker sound path of the electronic device 101 is activated.

According to an embodiment, the object 1135 for determining whether the sound path is activated may be provided in a pop-up form, independently of the control panel 1130. According to an embodiment, the electronic device 101 may not provide a control panel to a display surface (e.g., the second display surface 520) that is different from the display surface (e.g., the first display surface 510) in a direction in which the external device 1101 is wiredly connected.

According to an embodiment, when the object 1135 is selected by the user, the electronic device 101 may provide a control panel 1150 related to a sound path configuration through the first display surface 510. For example, the control panel 1150 may include user interfaces in which sound paths of application executed on the first display surface 510 and the second display surface 520 can be configured.

Figure 12:
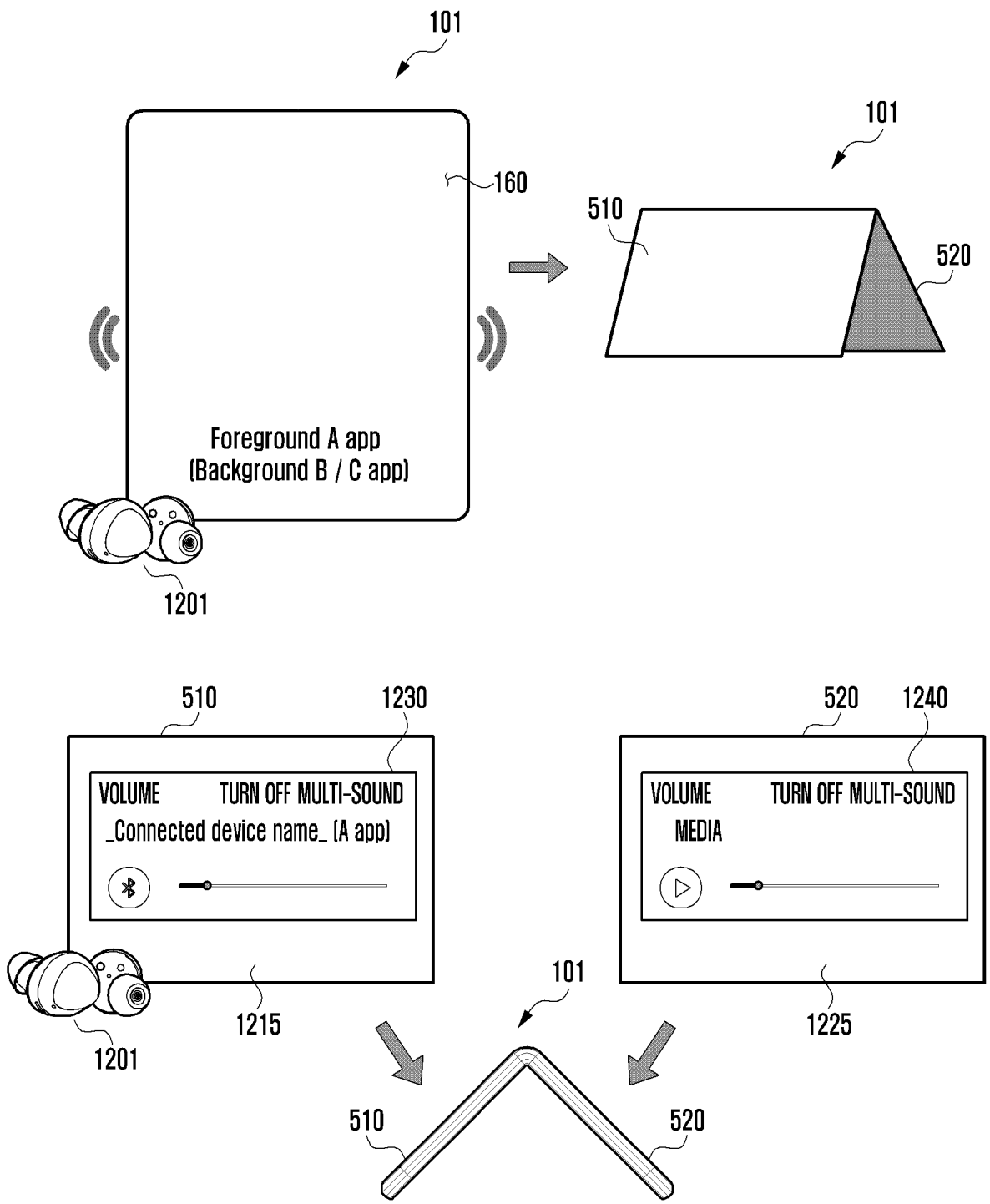
FIG. 12 is a diagram illustrating an example of a scenario of performing an operation based on a mode change in an electronic device according to various embodiments.

FIG. 12 is a diagram illustrating an example scenario of performing an operation based on a mode change in an electronic device according to various embodiments.

According to an embodiment, FIG. 12 may show an example in which an electronic device 101 and an external device 1201 (e.g., a wireless earbud) are connected to each other through wireless communication, and in which, when the electronic device 101 enters a designated mode (e.g., a tent mode) based on switching from a first state (e.g., an unfolded state) to a second state (e.g., a predetermined angle folded state), the electronic device 101 provides control panels 1230 and 1240 according to sound paths to a first display surface 510 and a second display surface 520, respectively. According to an embodiment, in the example illustrated in FIG. 12, an operation corresponding to the example illustrated in FIG. 11 may be performed, and detailed descriptions corresponding to each other will be omitted.

According to an embodiment, when entering the designated mode, the electronic device 101 may display an execution screen 1215 (or a first user interface) of a first application through the first display surface 510, and may display an execution screen 1225 (e.g., a second user interface) of a second application through the second display surface 520.

According to an embodiment, in FIG. 12, the electronic device 101 may have multiple sound paths (e.g., a first path for output by the external device 1201 and a second path for speaker output of the electronic device 101). For example, the electronic device 101 may separately use multiple sound paths such as the first path and the second path. For example, the electronic device 101 may be configure to output the audio data of the first application by the external device 1201 and to output the audio data of the second application by a speaker of the electronic device 101.

According to an embodiment, the electronic device 101 may provide, when entering the designated mode, the control panel 1230 related to volume control of the external device 1201 to a display surface (e.g., the first display surface 510) corresponding (or close) to a direction in which the external device 1201 is wirelessly connected (e.g., a direction in which the external device is identified using wireless communication (e.g., UWB)). According to an embodiment, the electronic device 101 may provide the control panel 1240 related to speaker volume control of the electronic device 101 to another undesignated display surface (e.g., the second display surface 520).

According to an embodiment, when entering the designated mode, if a designated sound path is configured (e.g., the external device 1201 is designated), the electronic device 101 may provide a separate object for determining whether the sound path is activated.

Figure 13:
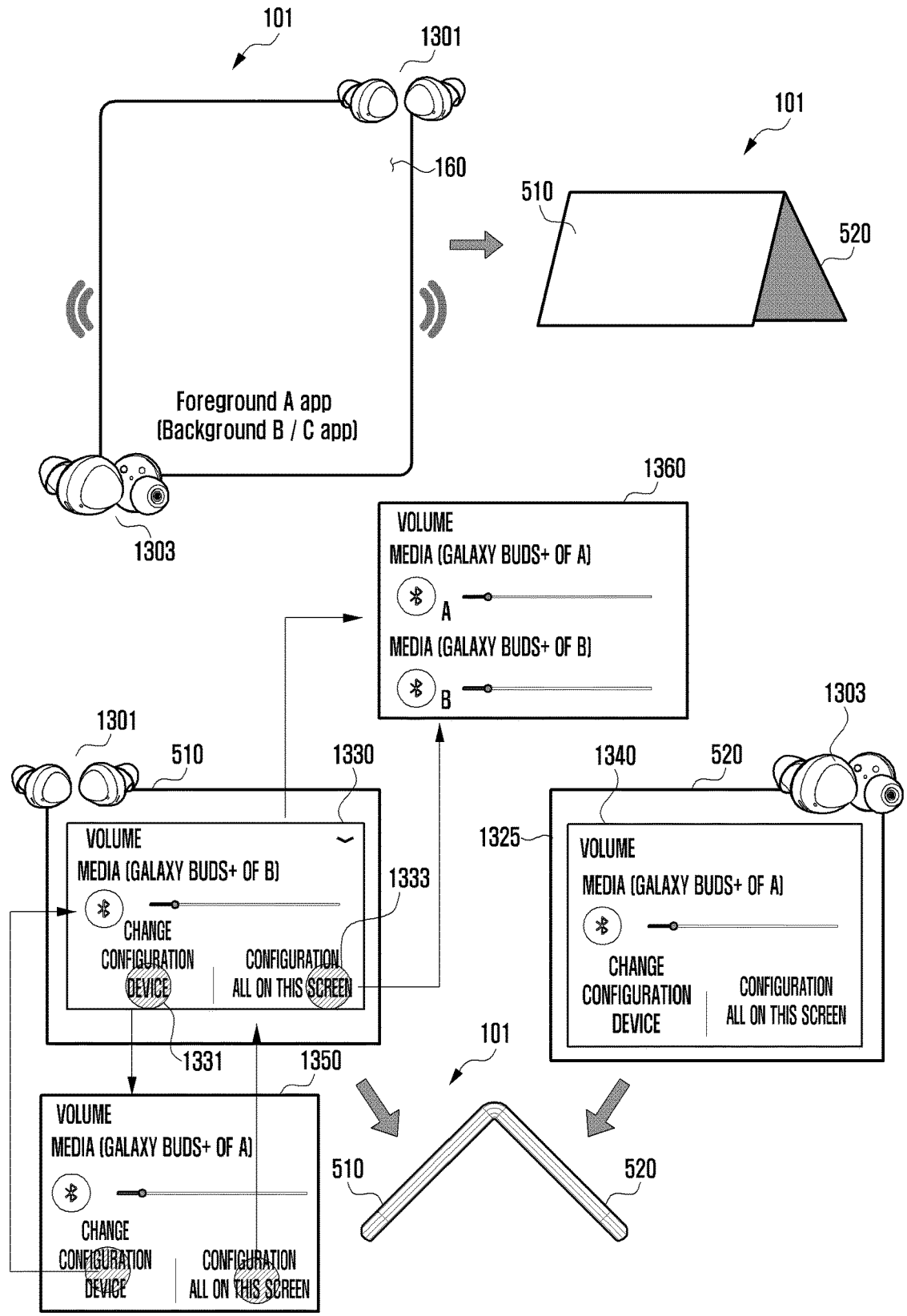
FIG. 13 is a diagram illustrating an example of a scenario of performing an operation based on a mode change in an electronic device according to various embodiments.

FIG. 13 is a diagram illustrating an example scenario of performing an operation based on a mode change in an electronic device according to various embodiments.

According to an embodiment, FIG. 13 may show an example in which an electronic device 101 is connected to each of external devices (e.g., a first external device 1301 (e.g., a first wireless earbud) and a second external device 1303 (e.g., a second wireless earbud)) through wireless communication, and in which, when the electronic device 101 enters a designated mode (e.g., a tent mode) based on switching from a first state (e.g., an unfolded state) to a second state (e.g., a predetermined angle folded state), the electronic device 101 provides control panels 1330 and 1340 according to sound paths to a first display surface 510 and a second display surface 520, respectively. According to an embodiment, in the example illustrated in FIG. 13, an operation corresponding to the examples illustrated in FIGS. 11 and 12 may be performed, and detailed descriptions corresponding to each other may not be repeated here.

According to an embodiment, in FIG. 13, the electronic device 101 may have multiple sound paths (e.g., a first path for output by the first external device 1301 and a second path for output by the second external device 1303). For example, the electronic device 101 may separately use multiple sound paths such as the first path and the second path. For example, FIG. 13 may show an example in which the electronic device 101 may output audio data of applications through the first external device 1301 and the second external device 1303 using multi-streaming (e.g., dual streaming).

According to an embodiment, the electronic device 101 may provide, when entering the designated mode, the control panels 1330 and 1340 related to volume control of the external devices 1301 and 1303 to respective display surfaces (e.g., the first display surface 510 and the second display surface 520) corresponding (or close) to directions in which the external devices 1301 and 1303 are wirelessly connected (e.g., directions in which the external devices are identified using wireless communication (e.g., UWB)). According to an embodiment, the electronic device 101 may provide, through the first display surface 510, a first control panel 1330 for the first external device 1301 relatively closed to the first display surface 510, and may provide, through the second display surface 520, a second control panel 1340 for the second external device 1303 relatively close to the second display surface 520.

According to an embodiment, the electronic device 101 may provide, through at least one of the first control panel 1330 and/or the second control panel 1340, an object 1331 for changing the control panels 1330 and 1340 (e.g., changing a configuration device) (e.g., changing control panel for controlling an external device on a corresponding display surface) and/or an object 1333 for integrating the control panels 1330 and 1340 to be controlled on any one display surface.

According to an embodiment, when a user selects the object 1331 for a configuration device change, the electronic device 101 may replace a control panel (e.g., the first control panel 1330) of a corresponding display surface (e.g., the first display surface 510) with a control panel 1350 (e.g., the second control panel 1340) of another display surface (e.g., the second display surface 520), and may provide the same. For example, the electronic device 101 may provide the second control panel 1340, with which the first control panel 1330 has been replaced, on the first display surface 510, and in response thereto, may the first control panel 1330, with which the second control panel 1340 has been replaced, on the second display surface 520.

According to an embodiment, in response to changing of the control panel, the electronic device 101 may change an external device (or a sound path) connected to each display surface. For example, the electronic device 101 may change a sound path of the first external device 1301 related with the first display surface 510 to a sound path of the second external device 1303, and may change a sound path of the second external device 1303 related to the second display surface 520 to a sound path of the first external device 1301.

According to an embodiment, when the user selects the object 1333 for integrating the control panels 1330 and 1340, the electronic device 101 may replace a control panel (e.g., the first control panel 1330 or the second control panel 1340) of a corresponding display surface (e.g., the first display surface 510 or the second display surface 520) with a third control panel 1360 in which the first control panel 1330 and the second control panel 1340 are integrated (e.g., such that both the first external device 1301 and the second external device 1303 can be controlled on the corresponding display surface). For example, the third control panel 1360 may include a user interface implemented such that both the first external device 1301 and the second external device 1303 connected to respective display surfaces 510 and 520 can be controlled on the correspond display surfaces.

According to an embodiment, when the corresponding external devices 1301 and 1303 are not configured (inferred) for the display surfaces 510 and 520, respectively, the electronic device 101 may configure an external device for each display surface based on user movement tracking, based on sensing using various sensors of the electronic device 101, and/or interaction according to button input of the external devices 1301 and 1303.

Figure 14:
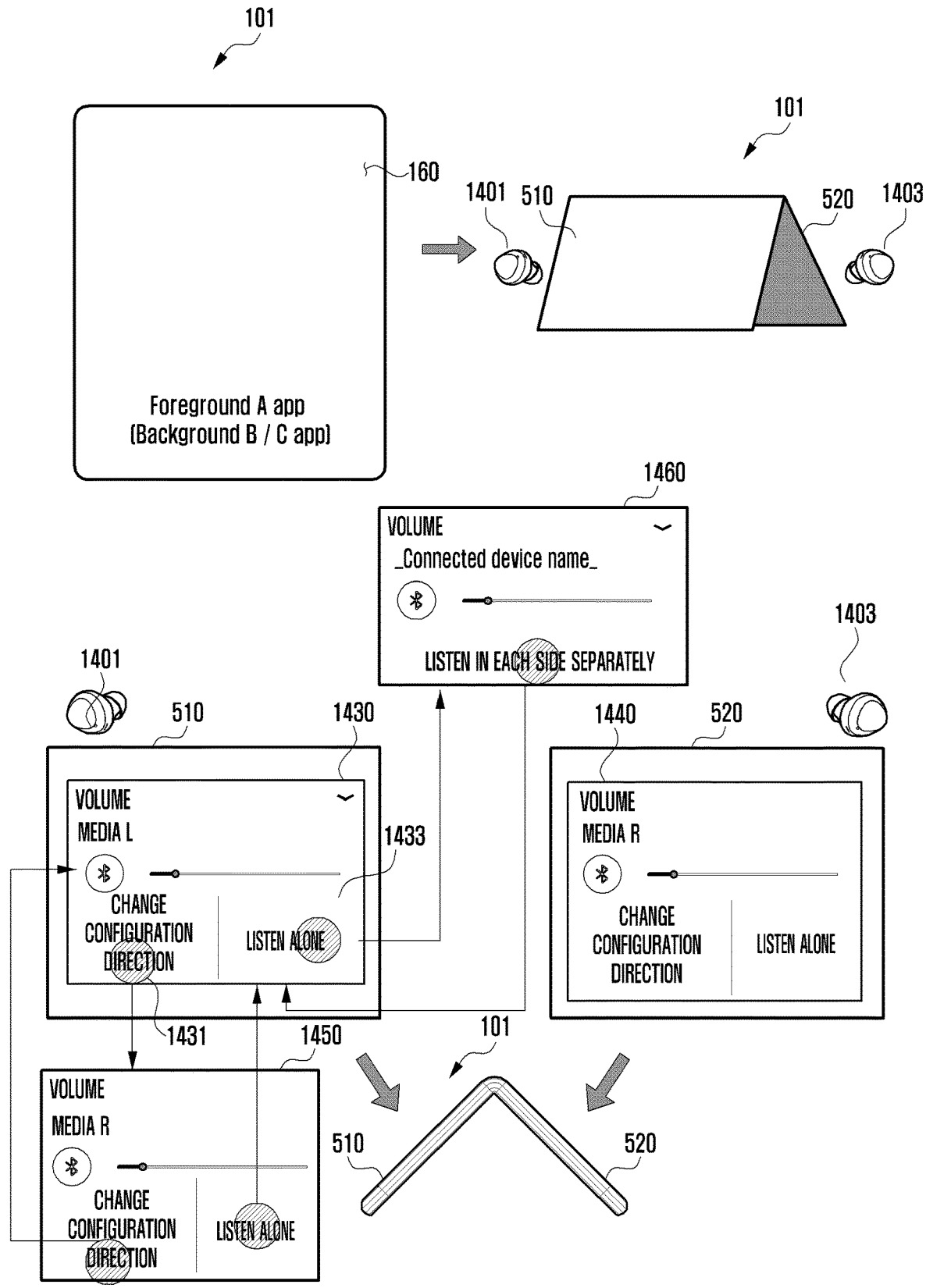
FIG. 14 is a diagram illustrating an example of a scenario of performing an operation based on a mode change in an electronic device according to various embodiments.

FIG. 14 is a diagram illustrating an example scenario of performing an operation based on a mode change in an electronic device according to various embodiments.

According to an embodiment, FIG. 14 may show an example in which an electronic device 101 is connected to an external device (e.g., a wireless earbud) through wireless communication, and in which, when the electronic device 101 enters a designated mode (e.g., a tent mode) based on switching from a first state (e.g., an unfolded state) to a second state (e.g., a predetermined angle folded state), the electronic device 101 separates the sound path of the external device (e.g., separates the sound path of the external device into a first path for a first audio output device 1401 (e.g., a left earbud) of the external device and a second path for a second audio output device 1403 (e.g., a right earbud) of the external device), and provides control panels 1430 and 1440 according to sound path separation through a first display surface 510 and a second display surface 520, respectively. According to an embodiment, in the example illustrated in FIG. 14, an operation corresponding to the examples illustrated in FIGS. 11, 12 and 13 may be performed, and detailed descriptions corresponding to each other may not be repeated here.

According to an embodiment, FIG. 14 may show an example in which, when the electronic device 101 enters the designated mode, the sound path of the electronic device 101 changes from a single path to multiple paths (e.g., the first path for output by the first audio output device 1401 and the second path for output by the second audio output device 1403).

For example, the electronic device 101 may be connected to one external device (e.g., a wireless earbud), and, when entering the designated mode, may separate the external device into the first audio output device 1401 and the second audio output device 1403 of the external device, and may change a sound path configured as the external device to a first path and a second path and may use the same. For example, FIG. 14 may show an example in which the electronic device 101 changes audio data of applications by multi-streaming and outputs the changed audio data by the first audio output device 1401 and the second audio output device 1403.

According to an embodiment, the electronic device 101 may provide, when entering the designated mode, the control panels 1430 and 1440 related to volume control of the audio output devices 1401 and 1403 to respective display surfaces (e.g., the first display surface 510 and the second display surface 520) corresponding (or close) to directions in which the audio output devices 1401 and 1403 are wirelessly connected (e.g., directions in which the audio output devices are identified using wireless communication (e.g., UWB)). According to an embodiment, the electronic device 101 may provide, through the first display surface 510, a first control panel 1430 for the first audio output device 1401 relatively close to the first display surface 510. According to an embodiment, the electronic device 101 may provide, through the second display surface 520, a second control panel 1440 for the second audio output device 1403 relatively close to the second display surface 520.

According to an embodiment, the electronic device 101 may provide a first object 1431 and/or a second object 1433 through at least one of the first control panel 1430 and/or the second control panel 1440. According to an embodiment, the first object 1431 may include an object for changing the control panels 1430 and 1440 (e.g., changing a configuration device). For example, changing the control panels 1430 and 1440 may include changing a control panel for controlling an audio device, which is to be controlled, on a corresponding display surface. According to an embodiment, the second object 1433 may include an object for integrating the first audio output device 1401 and the second audio output device 1403 into one external device and integrating sound paths, separated into the first audio output device 1401 and the second audio output device 1403, into one sound path of the external device.

According to an embodiment, when a user selects the object 1431 for changing a configuration device, the electronic device 101 may replace a control panel (e.g., the first control panel 1430) of a corresponding display surface (e.g., the first display surface 510) with a control panel 1450 (e.g., the second control panel 1440) of another display surface (e.g., the second display surface 520, and may provide the same. For example, the electronic device 101 may provide the second control panel 1440 replacing the first control panel 1430 on the first display surface 510 and, in response thereto, may provide the first control panel 1430 replacing the second control panel 1440 on the second display surface 520.

According to an embodiment, in response to changing of the control panel, the electronic device 101 may change an audio output device (or a sound path) connected to each display surface. For example, the electronic device 101 may change a sound path of the first audio output device 1401 related with the first display surface 510 to a sound path of the second audio output device 1403, and may change a sound path of the second audio output device 1403 related to the second display surface 520 to a sound path of the first audio output device 1401.

According to an embodiment, when the user selects the object 1433 for integrating the control panels 1430 and 1440, the electronic device 101 may replace a control panel (e.g., the first control panel 1430 or the second control panel 1440) of a corresponding display surface (e.g., the first display surface 510 or the second display surface 520) with a third control panel 1460 in which the first control panel 1430 and the second control panel 1440 are integrated. For example, the control panel integration may include integratedly operating the first audio output device 1401 and the second audio output device 1403 as one external device and integrating sound paths, separated into the first audio output device 1401 and the second audio output device 1403, into one sound path of the external device such that all of the audio devices 1401 and 1403 can be controlled on the corresponding display surface.

For example, the third control panel 1460 may include a user interface implemented such that the first audio output device 1401 and the second audio output device 1403 connected to respective display surfaces 510 and 520 are configured as one external device, and thus both thereof can be controlled on the correspond display surfaces. According to an embodiment, the electronic device 101 may recognize, based on selection of the object 1433, that a user connects the first audio output device 1401 and the second audio output device 1403 as one external device, and the user uses both the first audio output device 1401 and the second audio output device 1403 in the electronic device 101 (e.g., the user wears both a left earbud and a right earbud). According to an embodiment, the electronic device 101 may provide one integrated third control panel 1460 through a designated display surface (e.g., the first display surface 510) based on the recognition result.

Figure 15:
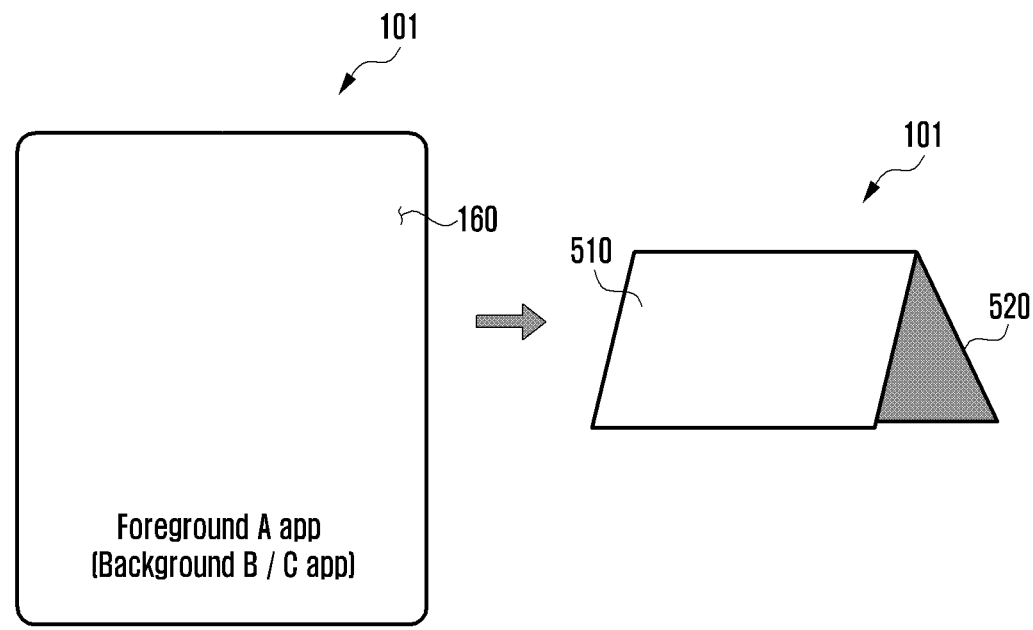
FIG. 15 is a diagram illustrating an example of a scenario of performing an operation based on a mode change in an electronic device according to various embodiments.
Figure 15:
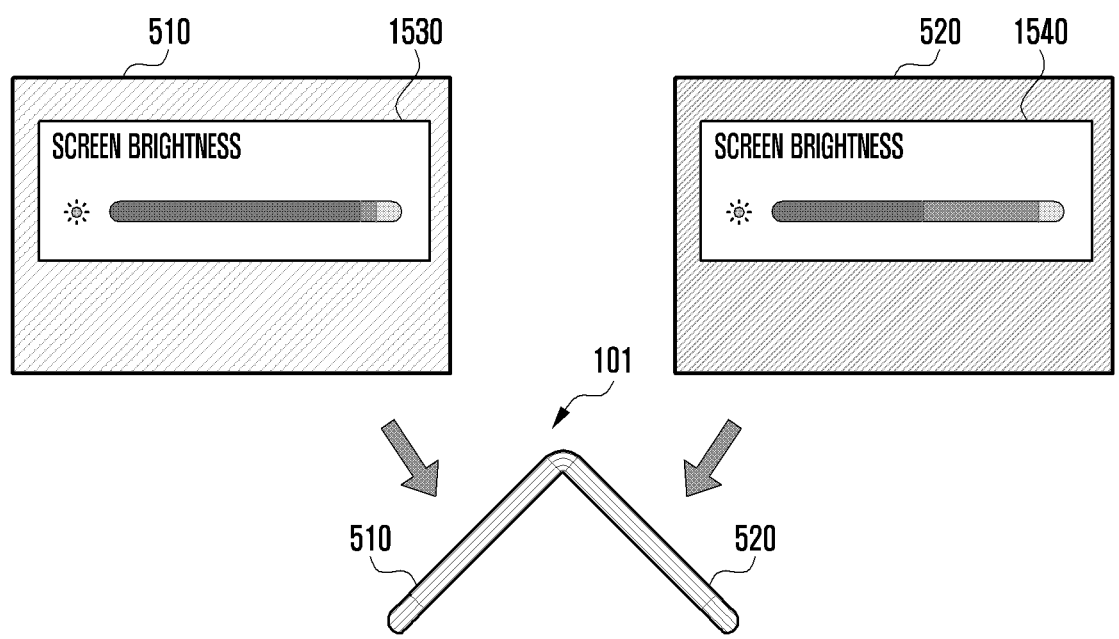

FIG. 15 is a diagram illustrating an example scenario of performing an operation based on a mode change in an electronic device according to various embodiments.

According to an embodiment, FIG. 15 may show an example in which, when an electronic device 101 enters a designated mode (e.g., a tent mode) based on switching from a first state (e.g., an unfolded state) to a second state (e.g., a predetermined angle folded state), the electronic device 101 provides control panels for controlling one display surface (e.g., a full screen) through first display surface 510 and a second display surface 520, respectively. According to an embodiment, in the example illustrated in FIG. 15, an operation corresponding to the examples illustrated in FIGS. 11, 12, 13 and 14 may be performed, and detailed descriptions corresponding to each other may not be repeated here.

According to an embodiment, FIG. 15 may show an example in which display brightness control panels 1530 and 1540 capable of adjusting the screen brightness of the first display surface 510 and the second display surface 520 are provided, based on entering the designated mode, through the first display surface 510 and the second display surface 520, respectively.

According to an embodiment, when entering the designated mode, the electronic device 101 may measure ambient illuminance for each display surface using various sensors (e.g., an illuminance sensor) of the electronic device 101, and may automatically adjust and provide, based on the measured each illuminance value, the screen brightness of the corresponding display surface. For example, the electronic device 101 may configure, based on illuminance values corresponding to the first display surface 510 and the second display surface 520, the screen brightness of the first display surface 510 and the screen brightness of the second display surface 520 to be identical to or different from each other.

According to an embodiment, the electronic device 101 may provide the control panels 1530 and 1540 through the first display surface 510 and the second display surface 520, respectively, and may adjust and provide, based user inputs using the control panels 1530 and 1540, the screen brightness of the corresponding display surfaces, respectively.

Figure 16:
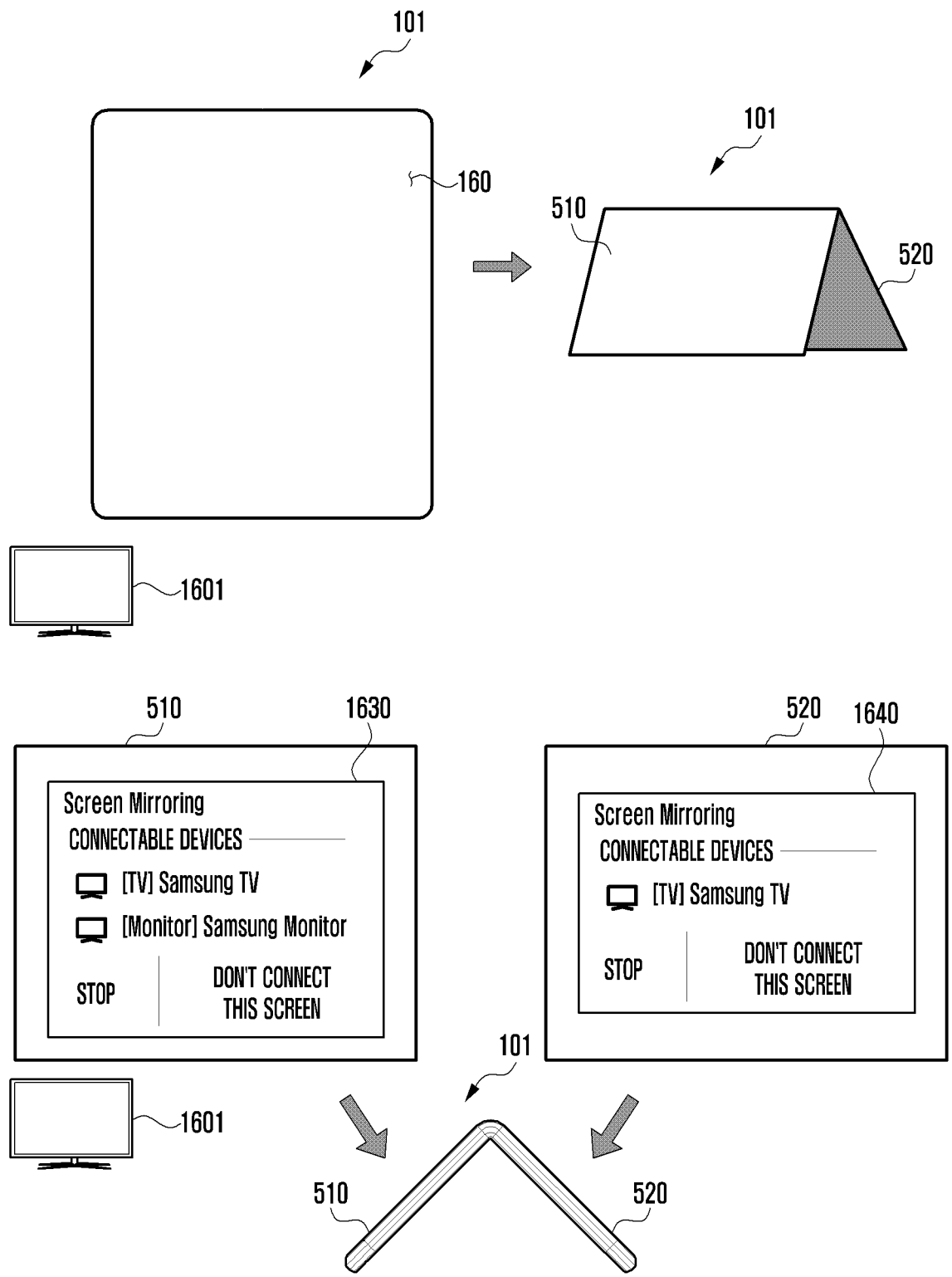
FIG. 16 is a diagram illustrating an example of a scenario of performing an operation based on a mode change in an electronic device according to various embodiments.

FIG. 16 is a diagram illustrating an example scenario of performing an operation based on a mode change in an electronic device according to various embodiments.

According to an embodiment, FIG. 16 may show an example in which an electronic device 101 is connected to an external device 1601 (e.g., a display device (e.g., TV, a monitor, a tablet, or a laptop PC)) through wireless communication, and in which, when the electronic device 101 enters a designated mode (e.g., a tent mode) based on switching from a first state (e.g., an unfolded state) to a second state (e.g., a predetermined angle folded state), the electronic device 101 provides control panels 1630 and 1640 according to screen mirroring through a first display surface 510 and/or a second display surface 520, respectively. According to an embodiment, in the example illustrated in FIG. 16, an operation corresponding to the examples illustrated in FIGS. 11, 12, 13, 14 and 15 may be performed, and detailed descriptions corresponding to each other may not be repeated here.

According to an embodiment, when entering the designated mode, the electronic device 101 may display an execution screen 1615 (or a first user interface) of a first application through the first display surface 510, and may display an execution screen 1625 (e.g., a second user interface) of a second application through the second display surface 520. According to an embodiment, the first application may be a foreground application (e.g., an application executed in the first state). According to an embodiment, the second application may be an application designated by a user, or may be an application most recently executed among background applications.

According to an embodiment, for example, when the second application for the second display surface 520 is not defined, the electronic device 101 may display a designated second application (e.g., a home screen) through the second display surface 520, or may turn off and provide the second display surface 520.

According to an embodiment, FIG. 16 may show an example in which the control panel for volume control is provided through the first display surface 510 and/or the second display surface 520. According to an embodiment, FIG. 16 may show an example in which a first external device 1601 (e.g., a monitor) and a second external device (not shown) (e.g., TV), connectable for screen mirroring exist around the electronic device 101 and the first external device 1601 exists in a position corresponding to the first display surface 510. The case in which the first external device 1601 exists in a position corresponding to the first display surface 510 may include the case in which the first external device 1601 exists in a close position compared with the second display surface 520 in a direction faced by the first display surface 510 or a direction in which the first external device 1601 is wirelessly connected. For example, the electronic device 101 may divide the data path for screen mirroring into multiple paths such as a first path and a second path to use the same. For example, the electronic device 101 may output video data of the first application through the first external device 1601, and may or may not output video data of the second application through the second external device (not shown).

According to an embodiment, when entering the designated mode, the electronic device 101 may provide a first control panel 1630, related to controlling of screen mirroring with the first external device 1601, to a display surface (e.g., the first display surface 510) close to the first external device 1601. According to an embodiment, the electronic device 101 may provide, to another undesignated display surface (e.g., the second display surface 520), a second control panel 1640 related to controlling of screen mirroring with another surrounding external device (e.g., the second external device) connectable for screen mirroring of the electronic device 101.

For example, the electronic device 101 may provide, through the first display surface 510 relatively close to the first external device 1601, the first control panel 1630 including information about the first external device 1601 and other connectable external device. In another example, the electronic device 101 may provide the second control panel 1640, including information about other connectable external devices and excluding information about the first external device 1601, through the second display surface 520 which is not relatively close to the first external device 1601.

According to an embodiment, a user may control, through the first control panel 1630 of the first display surface 510, the execution screen 1615 of the first application on the first display surface 510 to undergo screen mirroring with the first external device 1601. According to an embodiment, the user may control, through the second control panel 1640 of the second display surface 520, the execution screen 1625 of the second application of the second display surface 520 to undergo screen mirroring with the second external device (not shown).

A method of operating an electronic device performed by an electronic device according to an example embodiment of the disclosure may include: sensing execution of a designated mode in which the electronic device switches from a first state to a second state while a designated user interface is displayed as a full screen, performing, based on the sensing of entering the designated mode, screen splitting wherein the full screen is split into a first display surface and a second display surface, displaying designated user interfaces on the first display surface and the second display surface, respectively, and separately providing, based on the user interfaces of the first display surface and/or the second display surface, control panels related to the corresponding display surfaces.

According to an example embodiment, the providing the control panels may include: providing, through the first display surface, a first control panel for changing an attribute related to the first display surface, and providing, through the second display surface, a second control panel for changing an attribute related to the second display surface, wherein the first control panel and the second control panel operate independently of each other on the corresponding display surfaces.

According to an example embodiment, providing the control panels may include: providing a control panel through at least one of the first display surface and/or the second display surface, based at least on the state of use of the first display surface and the second display surface and/or the connection state of an external device.

According to an example embodiment, the changing of the attributes related to the display surfaces may include: changing of the configuration of the electronic device, controlling of functions of applications executed through the first display surface and the second display surface, and/or changing of functions and/or configurations of one or more external devices connected to the electronic device, which are based on the control panels corresponding to the first display surface and the second display surface, respectively, when the electronic device operates in the designated mode.

According to an example embodiment, the method may include: determining, based on the sensing of execution of the designated mode, whether the electronic device is interacting with an external device, determining device information of the external device based on the electronic device interacting with the external device, determining situation information according to the interaction with the external device, and separately providing a control panel for each display surface, based on the device information and/or the situation information, wherein the situation information includes operation information related to a display surface interacting with the external device and/or a function operating between the electronic device and the external device, and execution information related to an application executed through each split display surface.

According to an example embodiment, the providing the control panel may include: determining a first control panel for the first display surface, based on situation information related to the first display surface, and determining a second control panel for the second display surface, based on situation information related to the second display surface.

According to an example embodiment, the method may include: determining execution information related to each split display surface based on the electronic device not interacting with the external device, and separately providing a control panel for each display surface, based on the execution information.

According to an example embodiment, the providing the control panel may include: determining a first control panel for the first display surface, based on execution information related to the first display surface, and determining a second control panel for the second display surface, based on execution information related to the second display surface.

According to an example embodiment, the designated mode may include a tent mode, a flex mode, and/or a screen splitting mode, and the control panels may include a volume control panel, a sound path control panel, a display brightness control panel, and/or a mirroring control panel.

Various example embodiments disclosed in the disclosure and the drawings are merely examples provided by way of illustration and to aid in understanding of the disclosure, and do not limit the scope of the disclosure. Therefore, it should be understood that all modifications or modified forms capable of being derived from the disclosure in addition to the various example embodiments disclosed herein are included in the scope of the disclosure. It will also be understood that any of the embodiment(s) described herein may be used in conjunction with any other embodiment(s) described herein.

What is claimed is:

1. An electronic device comprising:
   a flexible display;
   at least one processor; and
   memory storing instructions that, when executed by the at least one processor individually and/or collectively, cause the electronic device to:
   display a first execution screen of a first application as a full screen of the flexible display,
   enter a designated mode when the electronic device switches from an unfolded state to a predetermined angle folded state while displaying the first execution screen of the first application as the full screen,
   based on the entering the designated mode,
   control the flexible display to display the first execution screen of the first application on the first display region and a second execution screen of a second application on the second display region,
   provide a first control panel related to the first application on the first display region and a second control panel related to the second application on the second display region,
   detect at least one of a first input via the first control panel or a second input via the second control panel,
   control, in response to detecting the first input via the first control panel, a function related to the first application based on the first input, and control, in response to detecting the second input via the second control panel, a function related to the second application based on the second input, wherein when the electronic device is in the predetermined angle folded state, the first display region faces a first direction and the second display region faces a second direction different from the first direction.

2. The electronic device of claim 1, wherein the first control panel and the second control panel include at least one of the following: a control object for changing functions related to a corresponding display region, an application object indicating application information to identify an application executed on a corresponding display region, and a device object indicating device information to identify external device interacting with a corresponding display region.

3. The electronic device of claim 2, wherein the instructions, when executed by the at least one processor, cause the electronic device to provide a control panel through at least one of the first display region and/or the second display region, based at least on a state of use of the first display region and the second display region and/or a connection state of an external device.

4. The electronic device of claim 2, wherein the changing of the attributes related to the display regions comprises: changing of a configuration of the electronic device, controlling of functions of applications executed through the first display region and the second display region, and/or changing of functions and/or configurations of one or more external devices connected to the electronic device, based on the control panels corresponding to the first display region and the second display region, respectively, based on the electronic device operating in the designated mode.

5. The electronic device of claim 2, wherein the instructions, when executed by the at least one processor, cause the electronic device to:

determine, based on the entering the designated mode, whether the electronic device is interacting with an external device, determine device information of the external device based on the electronic device interacting with the external device, determine situation information based on the interaction with the external device, and separately provide a control panel for each display region, based on the device information and/or the situation information.

6. The electronic device of claim 5, wherein the situation information comprises operation information related to a display region interacting with the external device and/or a function operating between the electronic device and the external device, and execution information related to an application executed through each split display region.

7. The electronic device of claim 5, wherein the instructions, when executed by the at least one processor, cause the electronic device to:

determine a first control panel for the first display region, based on situation information related to the first display region, and determine a second control panel for the second display region, based on situation information related to the second display region.

8. The electronic device of claim 5, wherein the instructions, when executed by the at least one processor, cause the electronic device to:

determine execution information related to each split display region based on the electronic device not interacting with the external device, and separately provide a control panel for each display region, based on the execution information.

9. The electronic device of claim 8, wherein the instructions, when executed by the at least one processor, cause the electronic device to:

determine a first control panel for the first display region, based on execution information related to the first display region, and determine a second control panel for the second display region, based on execution information related to the second display region.

10. The electronic device of claim 2, wherein the control panels comprise: a volume control panel, a sound path control panel, a display brightness control panel, and/or a mirroring control panel.

11. The electronic device of claim 1, wherein the designated mode comprises a tent mode and a flex mode.

12. A method of operating an electronic device having a flexible display, comprising:

displaying a first execution screen of a first application as a full screen of the flexible display;

entering a designated mode when the electronic device switches from an unfolded state to a predetermined angle folded state while displaying the first execution screen of the first application as the full screen;

based on the entering the designated mode, controlling the flexible display to display the first execution screen of the first application on the first display region and a second execution screen of a second application on the second display region;

providing a first control panel related to the first application the first display region and a second control panel related to the second application on the second display region;

detecting at least one of a first input via the first control panel or a second input via the second control panel;

controlling, in response to detecting the first input via the first control panel, a function related to the first application based on the first input; and controlling, in response to detecting the second input via the second control panel, a function related to the second application based on the second input, wherein when the electronic device is in the predetermined angle folded state, the first display region faces a first direction and the second display region faces a second direction different from the first direction.

13. The method of claim 12, wherein the first control panel and the second control panel include at least one of the following: a control object for changing functions related to a corresponding display region, an application object indicating application information to identify an application executed on a corresponding display region, and a device object indicating device information to identify an external device interacting with a corresponding display region.

14. The method of claim 13, wherein the providing of the control panels comprises: providing a control panel through at least one of the first display region and/or the second display region, based at least on a state of use of the first display region and the second display region and/or a connection state of an external device.

15. The method of claim 13, wherein the changing of the attributes related to the display regions comprises: changing of a configuration of the electronic device, controlling of functions of applications executed through the first display region and the second display region, and/or changing of functions and/or configurations of one or more external devices connected to the electronic device, based on the control panels corresponding to the first display region and the second display region, respectively, based on the electronic device operating in the designated mode.

16. The method of claim 13, comprising
determining, based on the entering the designated mode, whether the electronic device is interacting with an external device,
determining device information of the external device based on the electronic device interacting with the external device,
determining situation information based on the interaction with the external device, and
separately providing a control panel for each display region, based on the device information and/or the situation information,
wherein the situation information comprises: operation information related to a display region interacting with the external device and/or a function operating between the electronic device and the external device, and execution information related to an application executed through each split display region.

17. The method of claim 16, wherein the providing of the control panel comprises:
determining a first control panel for the first display region, based on situation information related to the first display region, and
determining a second control panel for the second display region, based on situation information related to the second display region.

18. The method of claim 16, comprising:
determining execution information related to each split display region based on the electronic device not interacting with the external device, and
separately providing a control panel for each display region, based on the execution information.

19. The method of claim 18, wherein the providing of the control panels comprises:
determining a first control panel for the first display region, based on execution information related to the first display region, and
determining a second control panel for the second display region, based on execution information related to the second display region.

20. The method of claim 12, wherein the designated mode comprises: a tent mode, a flex mode, and/or a screen splitting mode, and
wherein the control panels comprise: a volume control panel, a sound path control panel, a display brightness control panel, and/or a mirroring control panel.

* * * * *